US008617335B2

(12) United States Patent
Kanematsu et al.

(10) Patent No.: US 8,617,335 B2
(45) Date of Patent: Dec. 31, 2013

(54) MINIATURE CELL ARRAY STRUCTURE AND MANUFACTURING METHOD OF MINIATURIZED COMPOSITE COMPONENT USING SUCH A MINIATURE CELL ARRAY STRUCTURE

(75) Inventors: Toshihiro Kanematsu, Kanagawa (JP); Katsunori Suto, Kanagawa (JP); Tomohiro Harada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1048 days.

(21) Appl. No.: 12/065,911

(22) PCT Filed: Sep. 6, 2006

(86) PCT No.: PCT/JP2006/318096
§ 371 (c)(1),
(2), (4) Date: Mar. 6, 2008

(87) PCT Pub. No.: WO2007/029864
PCT Pub. Date: Mar. 15, 2007

(65) Prior Publication Data
US 2009/0133804 A1    May 28, 2009

(30) Foreign Application Priority Data

Sep. 9, 2005 (JP) .................................. 2005-262202
Nov. 7, 2005 (JP) .................................. 2005-322493

(51) Int. Cl.
*B29C 44/00* (2006.01)
(52) U.S. Cl.
USPC ........... 156/145; 156/156; 156/285; 264/101; 264/164; 264/167; 264/243; 264/280; 264/284; 264/293; 264/DIG. 78

(58) Field of Classification Search
USPC .......... 156/145, 156, 285; 264/101, 164, 167, 264/243, 280, 284, 293, DIG. 78
See application file for complete search history.

(56) References Cited

U.S. PATENT DOCUMENTS

| 3,765,810 | A | | 10/1973 | Smarook |
| 3,919,378 | A | * | 11/1975 | Smarook .................. 264/164 |
| 5,919,280 | A | * | 7/1999 | Oh et al. .................. 65/17.2 |
| 6,256,149 | B1 | * | 7/2001 | Rolfe ...................... 359/619 |
| 6,635,202 | B1 | | 10/2003 | Bugg et al. |
| 2005/0239228 | A1 | * | 10/2005 | Quenzer et al. ........... 438/29 |

FOREIGN PATENT DOCUMENTS

| JP | 56 34780 | 8/1981 |
| JP | 1 107202 | 4/1989 |
| JP | 08 108440 | 4/1996 |
| JP | 8 112873 | 5/1996 |
| JP | 10 80964 | 3/1998 |
| JP | 10 323909 | 12/1998 |
| JP | 11 291425 | 10/1999 |

(Continued)

*Primary Examiner* — Yogendra Gupta
*Assistant Examiner* — Joshel Rivera
(74) *Attorney, Agent, or Firm* — Oblon, Spivak, McClelland, Maier & Neustadt, L.L.P.

(57) ABSTRACT

A method of manufacturing a cell array structure includes a first step of laminating a deformable layer capable of causing plastic deformation on a substrate, the substrate being formed with plural, mutually separated depressions on a top surface thereof, such that the deformable layer forms a mutually isolated space in each of the plural depressions; and a second step of extending the space in each of the plural depressions by causing plastic deformation in the deformable layer, such that there are formed plural columnar cells respectively in correspondence to the plural depressions.

6 Claims, 18 Drawing Sheets

(56) References Cited

FOREIGN PATENT DOCUMENTS

| | | |
|---|---|---|
| JP | 2001 121567 | 5/2001 |
| JP | 2001-315217 | 11/2001 |
| JP | 2001315217 A * | 11/2001 |
| JP | 2003 80543 | 3/2003 |
| JP | 2003 098316 | 4/2003 |
| JP | 2004 29365 | 1/2004 |
| JP | 3 521 469 | 2/2004 |
| JP | 2004 45586 | 2/2004 |
| JP | 2004 102007 | 4/2004 |
| JP | 2004 118119 | 4/2004 |
| JP | 2004 233479 | 8/2004 |
| JP | 2004 258420 | 9/2004 |
| JP | 2004 341474 | 12/2004 |
| JP | 2005 62368 | 3/2005 |
| JP | 2005 205804 | 8/2005 |

* cited by examiner

IN/OUT PART
(CONICAL SHAPE,CAUSE OPTICAL DIFFUSION)

YOUNG-LAPLACE EQUATIONS
$\Delta P = P_i - P_L = \sigma(1/R_1 + 1/R_2)$

CORE MATERIAL LOADING

ROTATION

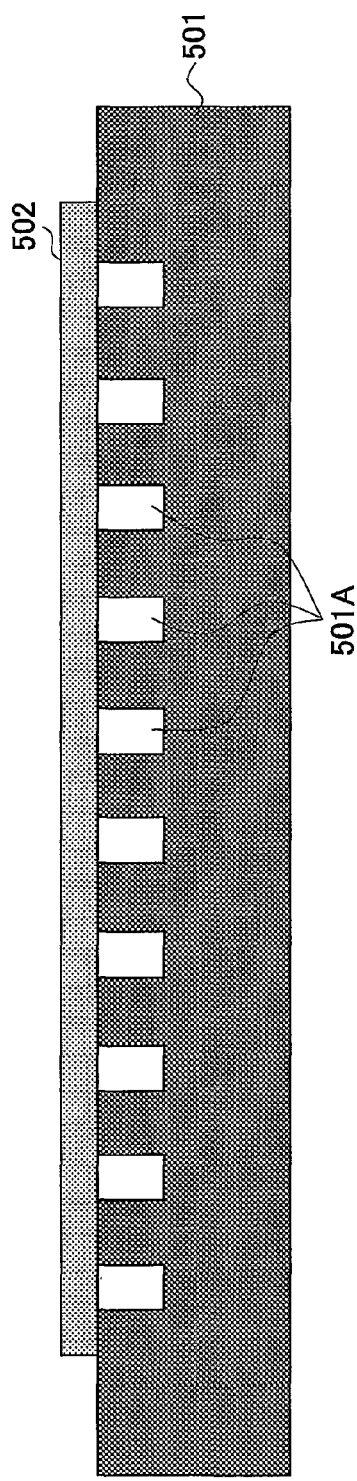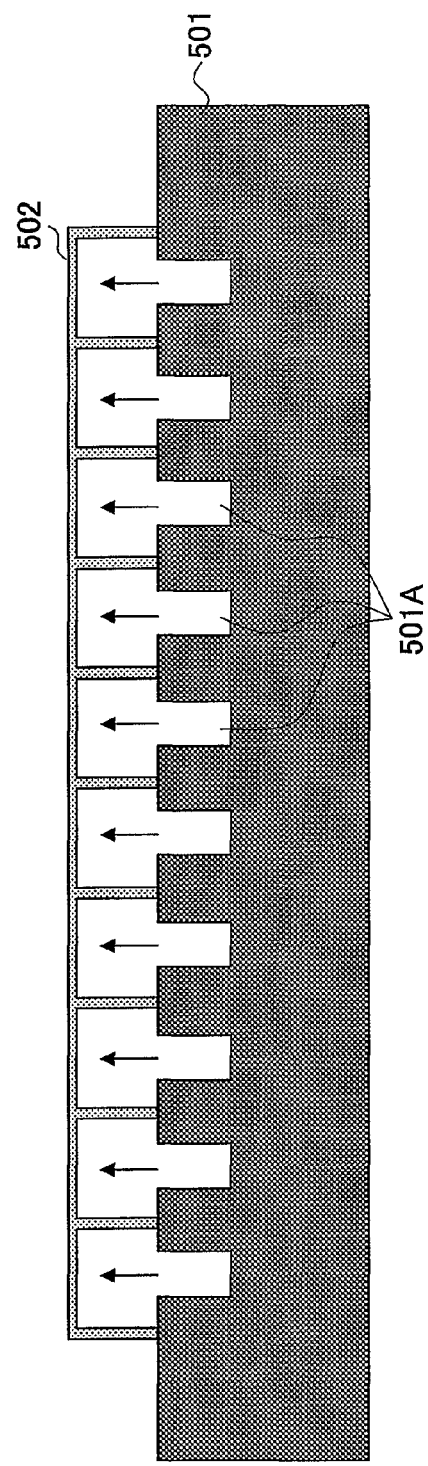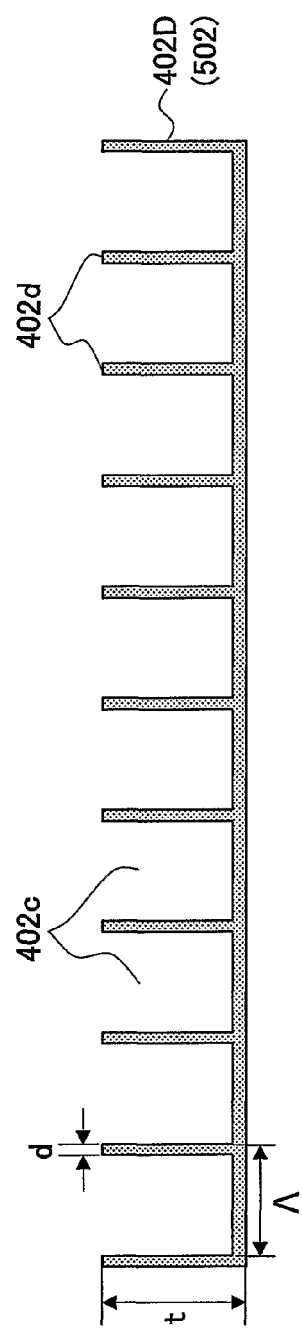
FIG.18A
FIG.18B
FIG.18C

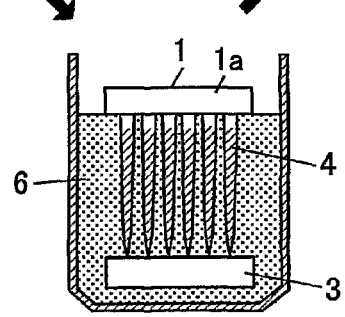

MINIATURE CELL ARRAY STRUCTURE AND MANUFACTURING METHOD OF MINIATURIZED COMPOSITE COMPONENT USING SUCH A MINIATURE CELL ARRAY STRUCTURE

TECHNICAL FIELD

The present invention generally relates to molding technology of plastic components and more particularly to the high-precision molding technology of highly miniaturized plastic composites formed of plural parts. The technology of the present invention is applicable to the production of miniature plastic lens arrays for use in optical scanning system of copying machines, facsimile machines, solid-state scanning type printers, and the like, or optical waveguides having built-in miniature lens array designed for optical transmission, production of lenses of digital cameras, production of optical fiber array used for projector screens, touch panels, photosensitive bodies for electron photography process, display devices, and the like.

BACKGROUND ART

Conventionally, there is a technology of forming high-precision plastic products formed of plural miniaturized components by way of molding. More specifically, there is a technology of forming: (1) miniature lens arrays; and (2) minute optical fiber arrays.

(1) Conventional Technology Related to Miniature Lens Arrays

For the conventional technology related to miniature lens arrays or microlens arrays, Japanese Laid-Open Patent Application 1-107202 (Patent Reference 1), Japanese Laid-Open Patent Application 2004-341474 (Patent Reference 2); Japanese Laid-Open Patent Application 2004-45586 (Patent Reference 3) are cited.

More specifically, Patent Reference 1 discloses a manufacturing method of a lens array according to the steps of: arraying GRIN (graded index) cylindrical lenses in a mold such that the optical axes thereof are aligned in a predetermined direction; and injecting a molten resin into the mold to form a molding in which the lens array and the resin are integrated.

Further, Patent Reference 2 describes the method for producing an optical component by an extrusion molding process. More specifically, the technology of Patent Reference 2 aims for a production method of an optical component characterized by long lifetime of the mold, capability of forming the lenses without distortion or optical defects and capability of integrating the lenses easily into a main apparatus with high precision.

Thus, a lens holding member is placed on a lower mold in such a manner that the lens holding member is formed with a large number of lens holes, and lenses are placed on the respective lens holes of the lens holding member. Thereby, the lower mold and the upper mold are formed respectively with a lower lens mold surface and an upper lens mold surface with the diameter smaller than the diameter of the lens holes, and lenses are formed by pressing the lower mold and the upper mold with each other. By using different materials for the lens and the lens holding member, it becomes possible to suppress optical noise of the lens. Particularly, by using a metal for the lens holding member, it becomes possible to mount the lens array to a main apparatus easily by way of soldering.

Further, Patent Reference 4 provides the method of manufacturing a high-precision composite molding having a thin optical shielding part. The reference eliminates the problem of misalignment between a molded product and a molding apparatus applying a secondary molding process to the molded product and enables manufacturing of a composite by molding process with high precision in terms of dimensions and pattern transfer precision. With this prior art, reference positions are defined respectively to the molded product produced by the first molding process and to the mold used for the secondary molding process for mutual alignment at the time of initial setup of the secondary molding process. Further, adjustment of dimensions is achieved by way of expanding or shrinking the primary molding or the mold or by way of mechanical dimensional adjustment. Further, the start timing of holding the primary molding in the secondary molding apparatus is controlled by detecting the mutual positional relationship therebetween or by evaluating the mutual positional relationship based on the linear thermal expansion coefficients by detecting the temperature. Alternatively, the start timing may be controlled based on the time calculated from the temperature and the dimension. Thereby, the start timing of the secondary molding is defined as the timing in which the temperature of the primary molding has reached a temperature higher than the glass transition point by 3-25° C.

Japanese Patent 3,521,469 (Patent Reference 5) describes a manufacturing method of resin lens array according to the process steps of: forming a resin layer on one side of a flat substrate by applying a transparent resin with a uniform thickness; urging the resin layer against an optical shielding plate of an optically shielding material formed with plural through-holes; forming lenses by extruding a part of the resin layer into the through-holes of the optical shielding plate; curing the resin layer to form a lens array sheet; and fixing the substrate and the optical shielding plate by way of the resin layer.

Further, Japanese Laid-Open Patent Application 2004-45586 provides a method of manufacturing a microlens array sheet having an optical shielding layer comprising the steps of: irradiating a ultraviolet radiation to a microlens array sheet comprising a consecutive lamination of: a transparent support substrate carrying microlenses at one side and a transparent a photosensitive layer or a thermoplastic resin layer at the other side; a UV-cure adhesive resin layer colored in black; and a protective film layer, such that the ultraviolet radiation is applied to the side where the lenses are formed; curing the UV-cure resin layer at the parts where the UV radiation is focused by the microlenses to cause transfer of the cured resin layer corresponding to the focused parts to the protective film layer; peeling off the cured resin layer of the focused parts from the transparent photosensitive layer or the thermoplastic layer by peeling the protective film layer therefrom and forming an optical shielding pattern of the UV-cure resin layer in correspondence to the parts not exposed to the UV radiation and remaining in intimate contact with the transparent photosensitive layer.

(2) Conventional Technology Related to Optical Fiber Arrays

There are various conventional arts related to manufacture of optical fiber arrays.

Japanese Laid-Open Patent Application 2004-118119 (Patent Reference 6) discloses a technology related to plastic optical fiber arrays and manufacturing method thereof. This prior art technology enables manufacturing of optical fiber array characterized by smooth core surface and reduced optical transmission loss with low cost in short time while using a simple manufacturing apparatus, and comprises the steps of: lowering a comb-shaped molding that includes plural bar-shaped fingers extending parallel with each other toward a UV-cure molten resin of liquid state such that end parts of the bar-shaped fingers contact with the molten resin simultaneously; pulling up the bar-shaped fingers; curing the resin pulled up from the molten resin with the foregoing end parts to form plural core parts simultaneously; forming a cladding layer by dipping the entire core parts into a molten UV-cure resin (cladding resin solution) to form a cladding layer composite; placing the cladding layer composite thus formed into a vessel together with a molten thermoplastic resin of low viscosity; forming the entire thermoplastic resin by heating the vessel together with the molten resin and the cladding layer composite to form a protective part; cutting the molding thus formed including therein the comb-shaped part at the end parts of the bar-shaped fingers; and polishing the cross-section of the end parts thus formed.

Japanese Laid-Open Patent Application 8-112873 (Patent Reference 7) discloses the technology related to a porous body and manufacturing process thereof.

More specifically, this reference aims for a light weight porous body of excellent thermal insulation and compressive strength and provides a sheet-shaped porous body comprising: square-shaped cells forming a lattice pattern in a thermoplastic resin body; and a highly expandable thermoplastic resin composition formed in each cell, the highly expandable thermoplastic resin composition having an expansion ratio of 20 times as large as the thermoplastic resin forming the cells.

Further, Japanese Laid-Open Patent Application 10-80964 (Patent Reference 8) discloses a honeycomb structure and manufacturing technology thereof.

More specifically, the reference teaches a strong transparent honeycomb structure of stable quality over a long period of time and the manufacturing method thereof, wherein the honeycomb structure includes three-dimensional packing of columnar cells of polygonal cross-sectional shape in a resin with high density. Thereby, the cells are formed without providing a junction part between the cell walls, and the cells are formed by placing an expandable substance in a resin with a three-dimensionally regular arrangement and by inducing expansion of the expandable substance.

Patent Reference 1 Japanese Laid-Open Patent Application 1-107202 official gazette
Patent Reference 2 Japanese Laid-Open Patent Application 2004-341474 official gazette
Patent Reference 3 Japanese Laid-Open Patent Application 2004-45586 official gazette
Patent Reference 4 Japanese Laid Open Patent Application 2003-80543 official gazette
Patent Reference 5 Japanese Patent 3,521,469
Patent Reference 6 Japanese Laid-Open Patent Application 2004-118119 official gazette
Patent Reference 7 Japanese Laid-Open Patent Application 8-112873 official gazette
Patent Reference 8 Japanese Laid-Open Patent Application 10-80964 official gazette
Patent Reference 9 Japanese Patent Publication 56-34780 official gazette

DISCLOSURE OF THE INVENTION

Problem with Manufacture of Lens Array

When manufacturing a miniature composite honeycomb structure, a typical example of which being the one shown in FIG. 1, more than one hundred lenses 72 are assembled to form a microlens array in an optical shielding part 71 in the form of lattice by way of molding process.

With such a honeycomb structure, there is a need of solving the problems that:

(a) forming the optical shielding part as thin as possible; and (b) maintaining high precision after formation of the composite.

In the case of the technology of Patent Reference 1, in which the optical shielding part is injected after arraying the lenses, there arises no problem with regard to the foregoing point (a). On the other hand, there is a possibility with this technology to form the lenses after formation of the optical shielding part. In such a case, however, the optical shielding part may be damaged at the time of removing the composite from the mold.

Further, in the case the microlens array is miniaturized and the thickness of the optical shielding part is reduced to about 20 μm, it is not possible to fill such a small space with ordinary injection molding process because of the too large viscosity of the resin, and it is not possible to form the optical shielding part by way of the molding process.

In order to attend to the problem (b) noted above, Patent Reference 2 describes the process of forming a lens array by injecting the lenses to the holes formed in the optical shielding part, followed by pressing. However, this process of Patent Reference 2 has a drawback in that it requires high precision for the dimension of the optical shielding part and high precision for the alignment of the optical shielding part.

In order to attend to the foregoing problem of Patent Reference 2, Patent Reference 4 proposes a dimension control by way of the temperature control. However, this process of Patent Reference 4 suffers from the problem of high cost in view of the need of using expensive apparatus and long cycle time for the forming process.

Further, Patent Reference 5 proposes the solution of the foregoing problems. More specifically, the process of Patent Reference 5 forms the lens part by urging a transparent sheet to the optical shielding part and causing plastic deformation in the sheet material. While this process is effective for eliminating the misalignment between the lenses and the optical shielding part, there is a problem that the lens shape cannot be controlled because of the absence of lens mold.

Patent Reference 3, on the other hand, teaches the method of forming a microlens array by forming the optical shielding pattern after formation of the microlenses, by disposing an adhesive UV-cure resin layer behind the lenses and causing focusing of UV radiation to the UV-cure resin through the lenses. While this method is effective for eliminating the misalignment between the lenses and the optical shielding part, the size and/or shape of the optical shielding part is restricted by the form of the lenses. More particularly, this process has a drawback in that the optical shielding pattern inevitably takes a tapered shape because of the curing taking place with the focusing of the UV radiation.

[Problem with Manufacture of Optical Fiber Array]

With regard to the method of forming the plastic optical fiber array, it takes a very long time when the optical fibers are laid one by one to form the optical fiber array. Such an approach is hardly efficient.

Thus, there is a proposal shown in FIG. 19A to form a comb-shaped molding 1 having plural bar-shaped fingers 1b extending parallel from a bridging part 1a and cause the bar-shaped fingers 1b to make a contact substantially simultaneously with the a molten resin 2 by lowering the comb-shaped molding 1 toward the molten resin 2.

Thereafter, the comb-shaped molding 1 is pulled up in the step of FIG. 19B gently in the upward direction while irradiating a weak UV radiation, and with this, the molten resin 2 is pulled up with the bar-shaped fingers 1b to form cores 4 extending parallel with each other in correspondence to the fingers 1b of the comb shaped member 1.

Further, in the step of FIG. 19C, a resin member 3 is attached to the distal end parts of the cores 4 to hold the cores 4 in the respective positions, and ultraviolet radiation is applied for fully curing the cores 4 thus formed.

Next, in the step of FIG. 19D, the cores 4 thus formed are dipped in a resin 6 held in a vessel in the state that the cores 4 are held between the comb-shaped molding 1 and the resin member 3, and with this, a cladding layer is formed on each of the cores 4.

Further, in the step of FIG. 19E, the member including the cores 4 carrying thereon the cladding layer and held between the comb-shaped molding 1 and the resin member 3 is dipped in a thermosetting resin 8 held in a vessel 9. After curing the thermosetting resin 8, the comb-shaped molding 1 and the resin member 3 are disconnected in the step of FIG. 19F.

This is the technology disclosed in Patent Reference 6.

With the technology of Patent Reference 6, on the other hand, there arises a problem, associated with its principle of forming the cores by pulling up the comb-shaped member 1, in that the cores 4 inevitably have a tapered shape. Thus, the optical fiber array formed with such a process suffers from the problem of low efficiency of light utilization.

The present invention addresses the foregoing problem by forming the cladding layer at first by an extension process, followed by injection of core material into the hollow space inside the cladding layer to form a plastic optical fiber array.

With such a process of forming the cladding layer part at first, there is a need of providing the technology of forming a cell array structure in which columnar cells are formed side-by-side.

Conventionally, there is a process of forming a honeycomb structure according to Japanese Patent Publication 56-34780 (Patent Reference 9) comprising the steps of holding a plastic material between heating platens having an escaping holes of the plastic material; pressing and heating the resin between the platens; and pulling apart the platens from each other to expand the plastic material. This conventional process, which uses a plastic material for the honeycomb structure, however, has a drawback in that the honeycomb structure has a thick cell wall.

Further, similar problem arises also in the technology described in Patent Reference 7 or Patent Reference 8 because of the use of thermoplastic resin.

Meanwhile, it is known to form a cell of very thin cell wall by expanding water containing surfactant as in the case of soap bubble. With this process, it is possible to form a cell having a wall thickness of several nanometers to several microns. On the other hand, soap bubbles use the effects of electrostatic repulsion, interaction between hydrophobic groups, Marangoni effect, and the like, wherein such effects become insignificant with drying of the film and the soap bubble is collapsed in due course. Further, in the case of plastic, none of these effects are available.

In the bubbling process for forming a honeycomb structure or cell array structure of elongated columnar shape, it is important to cause the bubbling at the same time. When the bubbled are formed one by one without relationship, the bubbles take a spherical form and the desired honeycomb structure is not formed.

It should be noted that Patent Reference 7 and Patent Reference 8 attempts the bubbling by way of heating, while such formation of bubbles by heating cannot form the desired honeycomb structure unless the heating is achieved with uniform temperature.

Further, the technology of Patent Reference 9 forms the honeycomb structure by the operation of separating the platens from each other as noted before, while it is very important with such a process to control the viscosity of the plastic to be uniform. Thus, formation of honeycomb structure with this process is also difficult.

In an aspect, the present invention provides a method of forming a cellular array structure in which plural columnar cells are disposed adjacent to each other, comprising:

a first step of laminating a deformable layer on a substrate formed with plural depressions, said plural depressions being formed in said substrate in a manner isolated from each other, said deformable layer being laminated on said substrate such that said depressions define respective spaces isolated from each other; and a second step of causing said space to expand in said plural depressions by causing plastic deformation in said deformable layer, such that said plural columnar cells are formed in said deformable layer respectively in correspondence to said depressions.

According to the present invention, it becomes possible to form a cellular array structure in which plural columnar cells defined by a cell wall of very small thickness are disposed adjacent with each other, by a simple and reliable process.

In another aspect, the present invention provides a method for manufacturing a miniature composite component in which plural columnar members are disposed in a matrix, comprising:

a first step of laminating a deformable layer on a substrate formed with plural depressions, said plural depressions being formed in said substrate in a manner isolated from each other, said deformable layer being laminated on said substrate such that said depressions define respective spaces isolated from each other;

a second step of causing said space to expand in said plural depressions by causing plastic deformation in said deformable layer, such that plural columnar cells are formed in said deformable layer respectively in correspondence to said depressions; and forming said plural columnar members respectively in said plural columnar cells, said deformable member forming said matrix.

According to the present invention, it becomes possible to form a miniature composite component in which plural columnar members are disposed in a matrix in the form or array. Particularly, it becomes possible with the present invention to form the columnar members in the form of microlens array defined with thin shells forming an optical shielding part.

In another aspect, the present invention provides a microlens array, comprising:

plural optically transparent parts each carrying a microlens at least on one end part thereof; and a boundary part provided to each of said optically transparent parts, said plural optically transparent parts being disposed adjacent to each other across said boundary part to form a microlens array.

According to the present invention, it becomes possible to form a microlens array such that each microlens forming the array carries an opaque thin film having a thickness of several microns or less on the sidewall surface thereof. Because the thickness of the opaque thin film is small, the microlens array of the present invention provides a large aperture while suppressing the stray light at the same time.

Other objects and further features of the present invention will be come apparent from the following detailed description when read in conjunction with the attached drawings.

BRIEF DESCRIPTION OF THE DRAWINGS

FIGS. 18A-18H are diagrams showing the manufacturing process of the electronic reusable paper of FIG. 17;

BEST MODE FOR CARRYING OUT THE INVENTION

Overview of the Invention

Figure 1:
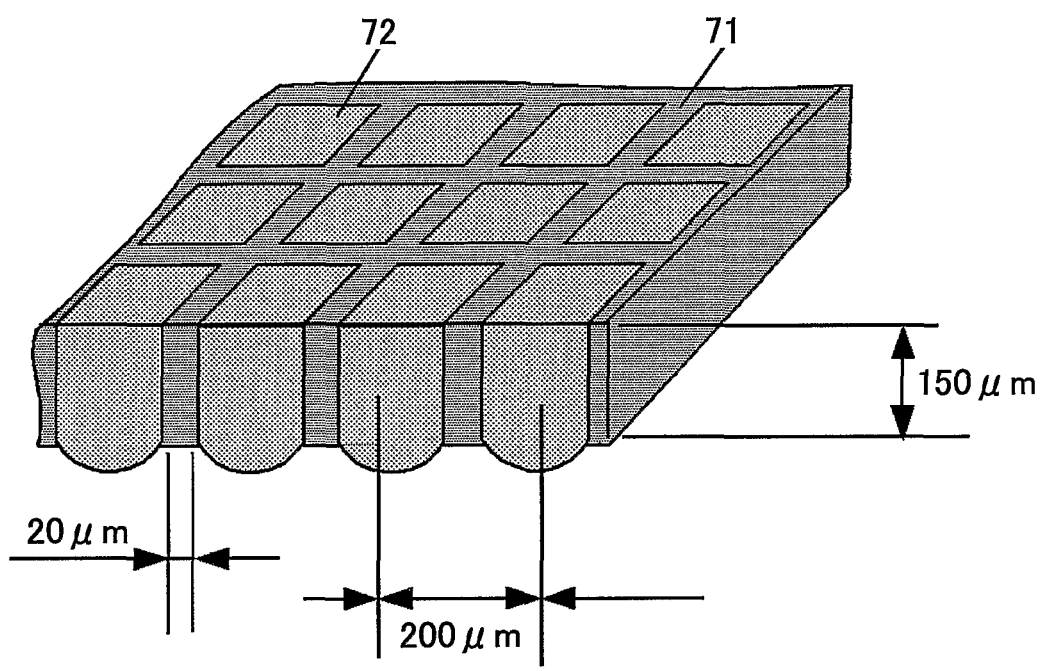
FIG. 1 is an oblique view diagram showing an example of a lens array of the present invention.

In view of the prior art noted heretofore, the present invention has its main objective of:

(1) providing a method of manufacturing a miniature cell array structure including therein an array of miniature columnar cells comprising the steps of: expanding plural, mutually isolated cells in a common direction with mutually identical expansion time and expansion amount such that the miniature columnar cells are formed adjacent with each other across a thin shell wall; and fixing the expanded columnar cells promptly while maintaining respective shapes thereof.

Further, the present invention has a first subsidiary objective of:

(1.1) providing a simple and easy method of manufacturing a miniature lens array in which individual miniature lenses forming the array have high precision and formed in a manner that the individual lenses are isolated from each other by a thin optical shielding part.

Further, the present invention has a second subsidiary objective of:

(1.2) providing a simple and easy method of manufacturing an optical fiber array capable of forming an optical fiber array with high precision and with high efficiency of utilization of light.

The main objective of the present invention is attained by the method of manufacturing a miniature cell array structure comprising: a first step of covering a first substrate formed with plural, mutually independent depressions at respective locations with a first material having a function of plastic deformation such that spaces are formed in the respective depressions; and a second step of forming elongated columnar cells isolated by a thin cell wall by causing to expand the foregoing spaces simultaneously in a predetermined direction by a gas pressure in the foregoing spaces.

According to the foregoing manufacturing method of the present invention, it becomes possible to cause the expansion of the first material with the gas pressure of the spaced by decreasing the pressure at the side of the substrate covered with the first material.

Here, it should be noted that "mutually independent depressions" noted above means that individual depressions form a respective, mutually isolated spaces not communicating with the rear side of the first material or communicating with other depressions.

The first subsidiary objective of the present invention is attained by the method of manufacturing a miniature composite component, comprising: a first step of covering a first substrate formed with plural, mutually independent depressions at respective locations with a first material having a function of plastic deformation such that spaces are formed in the respective depressions; a second step of expanding the first material at plural locations simultaneously by the gas pressure of the spaces to form elongated cells having thin cell walls such that the cells are elongated in a predetermined, common direction; and third step of forming the cellular shape and the depressions by injecting a second material without departing the first material from the first substrate.

The foregoing depressions may have the shape of a lens. In this case, the present invention provides a method of manufacturing a lens array as the miniature composite component, by forming the lenses by using the miniature cell array structure of the first material as the optical shielding part and injecting the material of lens into the miniature cell array structure without separating the lens mold and the miniature cell array structure (optical shielding part) from each other.

The second subsidiary objective of the present invention is attained by the method of manufacturing an optical fiber plate in which the cell array structure is injected with a core member having a refractive index larger than the refractive index of the cell array structure. With this process, the cell array structure is removed subsequently, and the gap formed with such removal of the cell array is filled with a cladding material.

In order to solve the second subsidiary objective and to obtain a miniature cell array structure including therein elongated columnar cells defined with thin cell walls, the present invention discloses a method of arraying a number of bubbles or cells in an aqueous solution added with a surfactant and solidifying the bubbles after causing simultaneous dilatation in such a manner that the shape of the bubbles is maintained during the solidification process.

Particularly, the present invention provides the independent depressed spaces (depressions) on the top surface of the substrate and uses the means of controlling the pressure of the ambient in which the substrate is placed.

Further, in order to dry the cellular array structure without causing disintegration in the shape thereof, the present invention discloses a method of using a gelatin solution that causes a sol-gel transition with temperature change for the deformable material. With this, the gelatin solution is changed to gel for increasing the rigidity thereof before conducting the drying process. Here, it should be noted that the "deformable material" noted above means the material that forms the cellular array structure therein when it is processed according to the present invention.

According to the present invention, the method of manufacturing the cellular array structure comprises the steps of: covering a top surface of a substrate (A) formed with minute depressions with high density with a deformable material (B) having the function of ductile deformation under a predetermined condition by applying the deformable material (B) on the top surface of the substrate (A); causing expansion in the deformable material (B) by the gas pressure in the closed spaces formed between the depressions and the deformable material (B) such that the plural spaces are elongated simultaneously and such that there are formed a number of elongated cells extending in a predetermined direction in the state separated from each other by thin walls having a micrometer thickness, wherein the depressions on the substrate (A) are formed in a manner isolated from each other.

With regard to the manufacturing method of the cellular array structure, it becomes possible to extend the deformable material (B) by lowering the pressure at the side of the substrate (A) covered by the deformable material (B).

With the foregoing method of manufacturing the cellular array structure, it is possible to use a gelatin aqueous solution added with a surfactant for the deformable material (B).

Further, the method of manufacturing the cellular array structure may be conducted by providing a ventilation space behind the deformable material (B) such that the deformable material (B) is dried from this side.

With regard to the method of manufacturing the cellular array structure, it is preferable to form the ventilation space behind the deformable material (B) provided on the substrate (A) and causes a member to make contact with the deformable cell array structure (B) from the behind such that the member is formed with penetrating holes with a pitch smaller than the pitch of the columnar cells formed in the deformable material (B). Thereby, drying of the deformable material (B) is conducted via such through-holes.

Further, it is preferable to process the depressions such that the depressions have a water-repellant surface. Further, it is preferable to form the depressions such that the depressions have a large diameter in the interior of the substrate (A) as compared with at the top surface.

Next, the means of solution of the second subsidiary objective will be explained.

1) The Means for Expanding the Cellular Array Structure
For the means of expanding the cellular array structure such that plural columnar cells are formed side by side therein, there is provided a substrate structure in which plural depressions are formed on the surface of a substrate, in combination with the means for applying the deformable material such that there are formed spaces between the respective depressions and the deformable material formed on the substrate.

2) The Means for Forming Thin Cell Walls
(1) In order to form the columnar cells with thin cell walls, the present invention uses an aqueous solution containing a surfactant and dissolved with a gelatin that causes a sol-gel transition upon temperature change for the means for forming the thin cell walls.
(2) Further, the present invention uses the means for causing dry shrinking. Here, it should be noted that this means for causing dry shrinking means a depressurizing process conducted by using a pressure control apparatus. Therein, evaporation of water content contained in the gelatin is accelerated, and with this, thinning of the cell wall caused by shrinkage of the volume of the material forming the cell wall, which in turn is caused by the water evaporation, is facilitated.

3) The Means for Solidifying the Cell Walls while Maintaining the Columnar Cell Array Structure
(1) For solidifying the cell walls while maintaining the columnar cell array structure, the present invention uses an aqueous solution added with a surfactant and dissolved with a gelatin that causes a sol-gel transition with temperature, for the material of the deformable material.
(2) Further, the present invention controls the temperature to the state of sols during the phase of expansion and control the temperature to the state of gels after the expansion has been completed.
(3) Further, the present invention secures a space for facilitating drying of the deformable material while not restricting the expansion thereof. With this, there is facilitated evaporation of water as a result of decompression, and the cell array structure formed as a result of the expansion of the deformable material is solidified as a result of the drying.

4) Other Means
Further, the present invention attains the simultaneous expansion of the cells and high speed drying of the deformable material at the same time by depressurizing by way of depressurizing means.

[The Method of Manufacturing Optical Fiber Array]

Further, the present invention provides a method of manufacturing an optical fiber array based on the foregoing method of manufacturing miniature cellular array structure. Thus, the present invention forms an optical fiber array in which a large number of optical fibers are disposed in the form of high-density array, by injecting core material of a refractive index higher than the refractive index of the deformable material (B), into the cells in the miniature cell array structure formed of the deformable material (B) now forming the cell walls.

Further, the present invention provides a "method of manufacturing an optical fiber array", comprising the steps of: injecting a core material into the cells of a miniature cell array structure formed by the "method of manufacturing a miniature cellular array structure"; removing the deformable material (B); and forming a large number of optical fibers in the form of an array in the spaces formed as a result of the step of removing the deformable material (B) by filling the spaces thus formed simultaneously with a cladding material.

(1) First Aspect of the Invention

According to a first aspect, the present invention provides a method of manufacturing a miniature cell array structure, comprising: a first step of covering a surface of a first substrate formed with a large number of mutually independent depressions (depressions not communicating to the outside or other depressions) at respective, predetermined locations, with a first material that has a function of ductile deformation under a predetermined condition, such that there are formed spaces in the foregoing depressions on the first substrate; and a second step of expanding and extending the first material by the gas pressure in the foregoing plural spaces simultaneously to form a miniature array of cells in the first material such that the plural cells extend parallel in a predetermined direction.

According to the first aspect, it becomes possible to form a number of mutually isolated cells in the manner that the cells are isolated by cell walls formed of the first material with high density and high precision at the same time.

(2) Second Aspect of the Invention

According to a second aspect of the present invention, the first material is subjected to the expansion and extension by the gas pressure inside the spaces, while the gas pressure is caused by depressurizing the side of the first substrate covered with the first material. According to the present invention, it becomes possible to form a large number of mutually independent cells separated with each other by the cell walls of the first material and formed with very high density, by a simple and quick process.

(3) Third Aspect of the Invention

According to a third aspect, the present invention provides a method of manufacturing a miniature composite component, comprising: a first step of covering a surface of a first substrate formed with a large number of mutually independent depressions at respective, predetermined locations, with a first material that has a function of ductile deformation under a predetermined condition, such that there are formed spaces in the foregoing depressions on the first substrate; a second step of expanding and extending the first material by the gas pressure in the foregoing plural spaces simultaneously to form a miniature array of cells in the first material such that the plural cells extend parallel in a predetermined direction; and a third step of injecting a second material to the plural cells without separating the first material and the first substrate from each other to form the cells such that the cells have respective end parts corresponding to the depressions on the first substrate According to the third aspect of the present invention, the spaces are formed in the depressions in the first step and the first material is expanded and extended in the second step, and thus, it becomes possible to form the plural cells simultaneously.

Further, by injecting the second material to the cells in a third step, it becomes possible to form the plural cells simultaneously, such that each cell includes an end part corresponding to the depression on the first substrate.

Particularly, it becomes possible to manufacture the cells without misalignment between the part formed in the first and second steps and the part formed in the third step, by conducting the third step continuously to the first and second steps, without separating the first material and the first substrate from each other.

(4) Fourth Aspect of the Invention

According to a fourth aspect, the present invention provides a method of manufacturing a miniature composite component, comprising: a first step of covering a surface of a first substrate formed with a large number of mutually independent depressions (depressions not communicating to the outside or other depressions) at respective, predetermined locations, with a first material that has a function of ductile deformation under a predetermined condition, such that there are formed spaces in the foregoing depressions on the first substrate; a second step of expanding and extending the first material by the gas pressure in the foregoing plural spaces simultaneously to form a miniature array of cells in the first material such that the plural cells extend parallel in a predetermined direction; a third step of adhering a third material to a cell wall of the plural cells without separating the first material and the first substrate form each other; and a fourth step of injecting a second material to the plural cells without separating the first material and the first substrate from each other to form the cells such that the cells have respective end parts corresponding to the depressions on the first substrate.

According to the present invention, it becomes possible to form the miniature composite component with high precision similarly to the third aspect of the present invention in view of the fact that the third and fourth steps are conducted without separating the first material and the first substrate from each other.

(5) Fifth Aspect of the Invention

According to a fifth aspect, the present invention carries out the expansion and the extension of the first material in the state that the first material is sandwiched between the first substrate and a second substrate.

According to the fifth aspect, it becomes possible to achieve high precision in the shape of the cells with the use of the second substrate. By using a flat slab for the second substrate, it becomes possible to form the cells to have a uniform length.

(6) Sixth Aspect of the Invention

According to a sixth aspect, it becomes possible to generate the gas pressure in the spaces corresponding to the depressions in the first step by causing depressurizing. With the use of depressurizing, the gas pressure becomes uniform in all the spaces corresponding to the foregoing plural depressions at any time, and it becomes possible to form the cells to have a uniform volume and shape.

(7) Seventh Aspect of the Invention

According to a seventh aspect, the second material is applied to the opening parts of the cells in a depressurized state, and the second material thus applied is injected into the cells by increasing the pressure beyond the atmospheric pressure.

According to the present invention, there is formed a uniform static pressure because of the use of the difference of gas pressure, the injection of the second material is conducted uniformly, without variation. Further, the first and second steps can be conducted in continuation in the same apparatus at the time of manufacturing, and it becomes possible to lower the cost of manufacturing the miniature composite component.

(8) Eighth Aspect of the Invention

According to an eighth aspect, it becomes possible to inject the second material into the cells by applying the second material at the opening parts of the cells in a depressurized state and subsequently applying a centrifugal force. By using the centrifugal force, the substances of different specific gravity are separated easily, and thus, it becomes possible to easily evacuate the gas in the cells and inject the second material in the liquid state into the cells.

(9) Ninth Aspect of the Invention

According to a ninth aspect, the present invention can manufacture a miniature lens array (microlens array) for the miniature composite component.

(10) Tenth Aspect of the Invention

According to a tenth aspect, the present invention uses a slab of hydrophobic nature for the second substrate. With this, the first material is easily separated from the second substrate in the second step, and thus, it becomes possible to form the penetrating cells easily.

(11) Eleventh Aspect of the Invention

According to an eleventh aspect, the depressions formed on the first substrate have the shape of a lens. Thus, according to the present invention, it becomes possible to transfer the lens shape to the cells in the third step of the third aspect or in the fourth step of the fourth aspect with the dilatation of the gas caused in the first step. Thus, transfer of the lens shape is achieved at the same time to the formation of the cells, and it becomes possible with the eleventh aspect to form a lens array for the miniature composite component.

(12) Twelfth Aspect of the Invention

According to a twelfth aspect, the present invention provides a miniature lens array in which the lenses forming the lens array are separated from each other by the first material having the function of optical shielding, by using a transparent material for the second material and an opaque or optical shielding material for the first material. With this, flare or stray light is eliminated in the lens array.

(13) Thirteen Aspect of the Invention

According to a thirteen aspect, the miniature lens array (microlens array) of the present invention is formed of the first material at least having the function of isolation, the second material having the function of optical transmission, and the third material having the function of optical shielding. With this, it becomes possible to obtain a miniature lens array (microlens array) free from stray light or flare. Because the miniature lens array of the thirteen aspect attains the foregoing three functions by three different materials, it becomes possible to enhance the respective functions as compared with the invention of the twelfth aspect. Further, there is attained increased degree of freedom at the time of manufacture of the miniature lens array.

(14) Fourteenth Aspect of the Invention

According to a fourteenth aspect, the present invention provides a method of manufacturing a miniature cell array structure, comprising the steps of: covering a top surface of a substrate (A) formed with minute depressions with high density with a deformable material (B) having a function of ductile deformation under a predetermined condition; extending the deformable material (B) by a gas pressure in plural spaces formed by the plural depressions and the deformable material, such that the plural spaces are expanded and elongated in a predetermined direction to form plural cells separated from each other by thin cell walls of a micron thickness, wherein the depressions are formed independently on the substrate (A).

According to the present invention, the depressions on the substrate (A) are formed independently to each other, and thus, the expansion time and the expansion amount become identical between the plural depressions when depressurization is applied. Thereby, the elongated, columnar cells are formed uniformly in a manner separated form each other by the cell walls formed of the deformable material.

(15) Fifteenth Aspect of the Invention

According to a fifteen aspect, the present invention depressurizes the side of the substrate (A) covered with the deformable material (B), and thus, the expansion time and expansion amount become identical between the adjacent depressions. Thereby, it becomes possible to grow a cell array formed of plural, mutually independent columnar cells uniformly.

(16) Sixteenth Aspect of the Invention

According to a sixteenth aspect, the present invention uses a gelatin aqueous solution added with a surfactant for the deformable material (B). Thus, the cells are grown like soap bubbles having a very thin cell wall, wherein the cells thus grown undergo transition to a gel thereafter. Thereby the cells are dried while maintaining the shape thereof. Further, because the temperature of sol-gel transition is about 40° C., it becomes possible to increase the amount of expansion at low temperatures while suppressing the boiling of water, and it becomes possible to use a high degree of depressurization for the growth of the cell array structure.

(17) Seventeenth Aspect of the Invention

According to a seventeenth aspect, the present invention provided a ventilation space at the side of the substrate (A) covered with the deformable material (B). With this, it is possible to dry the deformable material (B) form this side.

(18) Eighteenth Aspect of the Invention

According to an eighteenth aspect, the present invention causes a structural body formed with penetrating holes with a pitch smaller than the pitch of the cells in the cell array structure to make a contact with the deformable material (B) covering the top surface of the substrate (A) where the depressions are formed. With this, it becomes possible to control the relationship between the spaces formed in the structural body in the penetrating holes and the substrate (A), and the thickness of the deformable material (B) applied to the substrate (A) becomes uniform. Further, because the penetrating holes are formed with the pitch smaller than the pith of the cells in the deformable material (B), the cells can grow without losing their shapes. Further, by ventilating the space behind the deformable material (B) through the penetrating holes, the cells are solidified promptly.

(6) Nineteenth Aspect of the Invention

According to a nineteenth aspect, the present invention applies a process to make the depressions hydrophobic. With this, the deformable material (B) does not enter to the depressions at the time of application of the deformable material (B) upon the surface of the substrate (A).

(20) Twentieth Aspect of the Invention

According to a twelfth aspect of the present invention, the depressions are formed in the substrate (A) such that a diameter thereof is larger than a diameter of an opening part formed on the surface of the substrate (A) by the depressions.

According to the twentieth aspect, it becomes possible to apply the deformable material (B) on the surface of the substrate (A) without causing the deformable material (B) to invade substantially into the depressions on the substrate (A). Further, because of the reduced contact area of the opening parts, degassing from the depressions after the application of the deformable material (B) is reduced, and it becomes possible to cause maximum expansion for the cells at the time of the depressurizing.

(21) Twenty First Aspect of the Invention

According to a twenty first aspect, the present invention injects a core material having a refractive index larger than the refractive index of the deformable material (B) into the cells formed in the deformable material (B). Thus, it becomes possible to manufacture an optical fiber array with high dimensional precision and high efficiency of utilization of light, with low cost and high production efficiency.

(22) Twenty Second Aspect of the Invention

According to a twenty second aspect, the present invention removes the deformable material (B, after injecting the core material into the cells formed in the deformable material (B), and fills the gaps formed with the removal of the deformable material (B), with a cladding material. As a result, it becomes possible to manufacture an optical fiber array having resistance to water while using various materials for the cores.

WORKING EXAMPLES OF THE INVENTION

Next, description will be made with regard to (1) "manufacturing of lens array", and (2) "manufacturing of an optical fiber plate (optical fiber array)".

1. Manufacturing of Lens Array

Example 1

First, processing method pertinent to the third aspect of the invention will be explained with reference to FIG. 1 and FIGS. 2A-2F.

Lens Mold (First Substrate)

Figure 2A:
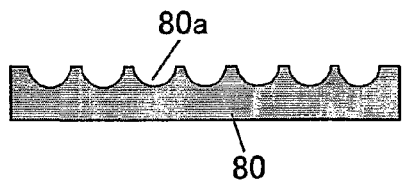
FIGS. 2A-2F are diagrams showing the manufacturing method of the lens array according to Embodiment 1 of the present invention.

Referring to FIG. 2A, it should be noted that a lens mold 80 (first substrate) is a mold that determines the pitch of the lens elements of a lens array to be formed. Further, the lens mold 80 determines the basic structure of the cell array formed by expanding a deformable opaque material 82 provided thereon so as to form voids therein in the form of columnar cells and used for holding the lens elements of the lens array. Further, the lens mold 80 is used for the mold of the lens elements in the process conducted after formation of the cell array.

In Example 1, the lens mold 80 is formed of a silicone rubber having a water-repellent surface, and lens parts 80a are formed in the lens mold 80 in a lattice pattern with a pitch of 200 μm. Each lens part 80a has a semispherical surface of the radius of 180 μm, wherein one hundred and sixty nine such lens parts 80a are formed on the lens mold 80 in thirteen rows and thirteen columns.

Opaque Material (First Material)

The opaque material 82 is a deformable material forming the cellular array structure including the elongated, columnar cells defined by cell walls. The opaque material 82 thereby functions to suppress flares or stray light when optical elements are formed in the cells. In the Example 1, an UV-cure acrylic resin of the refractive index of 1.56 is used for the opaque material 82. Thereby, in order to function as an opaque optical shield, the opaque material 82 is added with carbon black particles with the amount of 0.5 wt %. Because the opaque material 82 has the same refractive index to the lenses to be formed in the cells, there is caused no total reflection of light, and optical absorption is attained efficiently.

Lens Material (Second Material)

With Example 1, an UV-cure acrylic resin of the refractive index of 1.56 is used for lenses 83 that are formed in the opaque material 82 in correspondence to the columnar cells therein.

Pressure Control Apparatus

A pressure control apparatus 100 compresses and/or evacuating gases and is used for controlling the dimension, primarily the height, of the cell array structure forming the cellular walls in the opaque material 82.

[Function]

The process of Example 1 proceeds as shown in FIGS. 2B-2F.

Figure 2B:
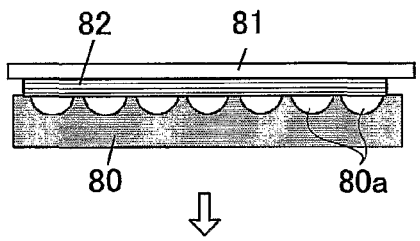

(1) In the step of FIG. 2B, the opaque material 82 is spin-coated on a flat glass substrate 81 transparent to ultraviolet lights and having a high degree of flatness, with a film thickness 0.1-100 μm in the state that the glass substrate 81 is placed upon the lens mold 80. In Example 1, the opaque material is spin-coated with the thickness of 20 μm (First Step).

The pressure control apparatus 100 is the apparatus capable of controlling the ambient pressure therein to a predetermined pressure. In Example 1, the ambient pressure is controlled usually to 0.1 MPa. It should be noted that this pressure is chosen for controlling the gas dilatation caused in the subsequent steps.

(2) The structure of FIG. 2B obtained in the first step is incorporated into the pressure control apparatus 100 and the ambient pressure therein is reduced to 0.003 MPa.

With this process of depressurization, there starts expansion or dilatation of gas in the spaces corresponding to the lens parts 80a, and thus, there is caused expansion of the spaces in the lens parts 80a with the expansion of the gas therein by causing deformation in the opaque material 82.

Figure 2C:
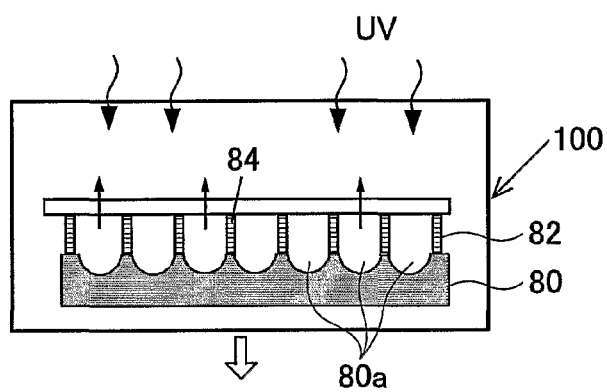

Here, it should be noted that the expansion takes place in all of the lens parts 80a on the lens mold 80 simultaneously, and thus, lateral expansion of the spaces is restricted because of the interference of the adjacent spaces. Thus, the expansion takes place solely in the direction upward, leading to formation of a cell array structure in which plural columnar cells are formed adjacent with each other in the deformed opaque material 82 in correspondence to the lens parts 80a in such a manner that the plural cells extend parallel with each other in the upward direction from the substrate 80. Thereby, the opaque material 82 forms opaque cell walls 84 defining the columnar cells formed therein. In the state of FIG. 2C, ultraviolet radiation is applied for about ten seconds for curing the opaque material 82 thus deformed, and with this, the opaque cell walls 84 thus formed are solidified and the cellular array structure is fixed (Second Step).

Figure 2D:
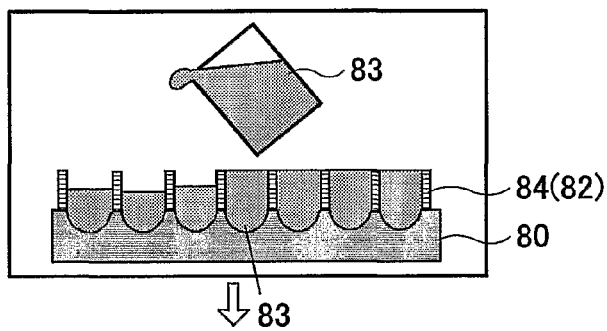

Next, in the step of FIG. 2D, the substrate 80 thus carrying thereon the cellular array structure is taken away from the pressure control apparatus 100. Further, after removing the glass substrate 81, the cells forming the cell array in the opaque material 82 are injected with a resin forming the lens, wherein this injection of the resin is conducted in a centrifugal separator under a centrifugal force of 3000G for 30 seconds (Third Step).

Here, it is important to note that the lens mold 80 and the cell walls 84 are not separated from each other during this process.

Figure 2E:
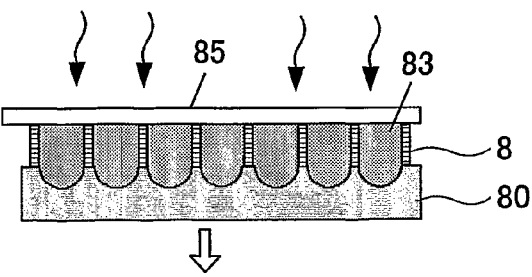
Figure 2F:
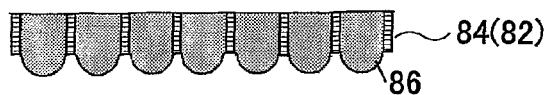

Next, in the step of FIG. 2E, a reflector plate 85 transparent to the ultraviolet radiations is placed is placed upon the structure of FIG. 2D and ultraviolet radiation is applied for about 10 seconds for curing the lens material 83. With this, lens elements 86 are formed in the cells of the cellular array structure in the form of lens array (Fourth Step).

Finally, the lens mold 80 and the reflector plate 85 are removed, and the lens array is obtained such that microlens elements 86 are held in the elongated, columnar cells defined with the opaque cell walls 84.

While not illustrated, it is preferable to anneal the structure thus obtained such that the curing proceeds thoroughly in the lens elements 86 and also in the cell walls 84 and such that there remains no uncured site, especially in the opaque cell walls 84.

Example 2

Example 2 is an embodiment corresponding to the second aspect of the invention and forms the opaque part in two steps as will be explained with reference to FIGS. 3A-3G. Therein, it will be noted that the process of Example 2 is different from the process of Example 1 in the following aspects:

(a) a cell wall 94 corresponding to the opaque cell wall 84 of Example 1 includes an opaque film 94a covering a cell wall 94b; and (b) an acrylic UV-cure resin is used for the material of the cell wall 94b (first material), while the opaque film (third material) 94a is formed by applying carbon black particles to the cell wall 94b.

Otherwise, Example 2 is identical to Example 1.

[Function]

Figure 3A:
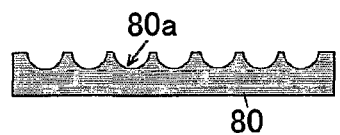
FIGS. 3A-3G are diagrams showing the manufacturing method of the lens array according to Embodiment 2 of the present invention.
Figure 3B:
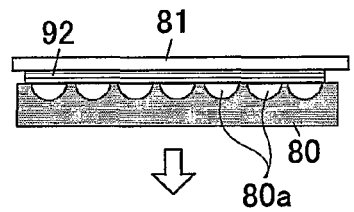
Figure 3C:
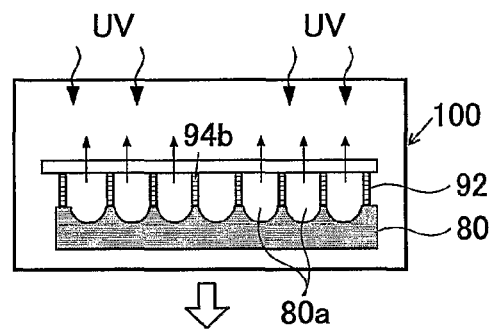
Figure 3D:
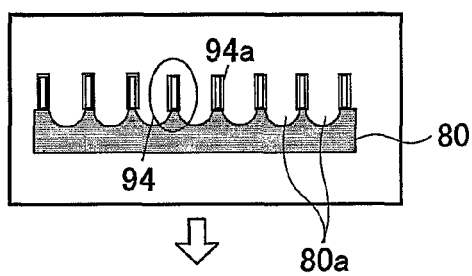
Figure 3E:
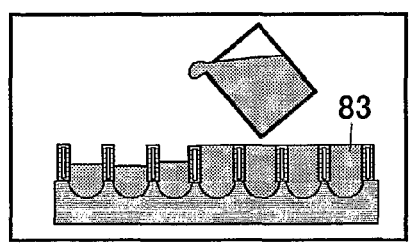
Figure 3F:
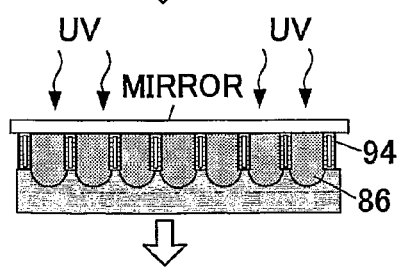
Figure 3G:
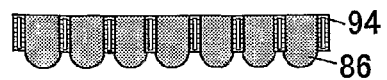

The process of Example 3 is shown in FIGS. 3A-3G, wherein there is no difference to the process of Example 1 except that an opaque liquid in which carbon black particles are dispersed in a volatile solvent is injected into the cells in the step of FIG. 3D after formation of the cell walls 94b. In FIGS. 3A-3G, it should be noted that those parts corresponding to the parts described previously with reference to Example 1 are designated by the same reference numerals and the description thereof will be omitted.

Thereby, because the lens mold 80 has water-repellency, the opaque liquid adheres selectively to the cell walls 94b, and the carbon black particles thus adhered to the cell wall 94 form the foregoing opaque film 94a (Third Step).

Because the material 92 corresponding to the material 82 of Example 1 is free from the opaque material with Example 2, the UV curing process of FIG. 3C proceeds efficiently, and curing of the cell walls 94b is attained in short time. Further, because it becomes possible to use the opaque material in large amount, the effect of eliminating stray light or flares is enhanced with Example 2, and it becomes possible to suppress the leakage of light in the lens array effectively.

Example 3

Figure 4A:
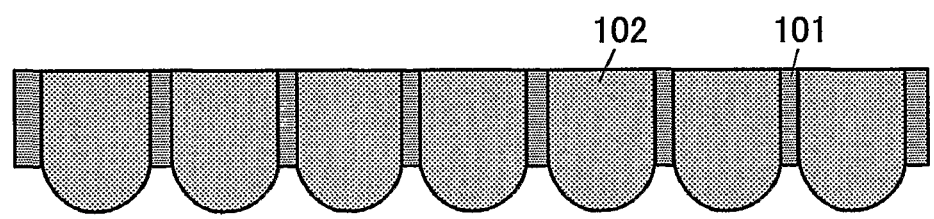
FIGS. 4A and 4B are diagrams showing a lens array of the present invention in a cross-sectional view.
Figure 4B:
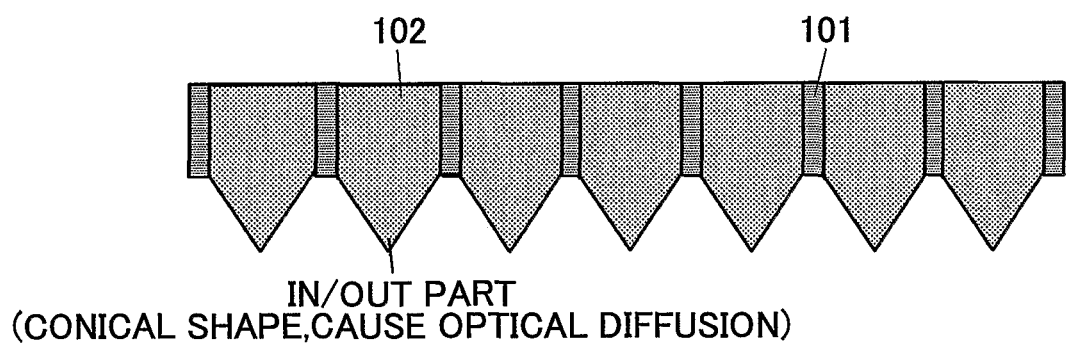

Example 3 shown in FIGS. 4A and 4B provides an optical fiber array (optical fiber plate) formed by using the process of Example 1 and Example 2.

Thus, with the construction of FIG. 4A, a cladding layer 101 forms a cell array structure holding cores 102 in the cells of the cell array structure, wherein Example 3 forms the cladding layer 101 by using a UV-cure methacrylate resin of the refractive index of 1.45 for the first material forming the cell walls while using a UV-cure acrylic resin of the refractive index of 1.56 for the second material used for the core 102.

Thereby, it is possible to provide lens effect to the optical fiber elements by forming the optical fiber elements to have a semi-spherical as shown in FIG. 4A.

Alternatively, it is possible to form the optical fiber elements to have an end part of conical shape for diffusing the light as shown in FIG. 4B.

Example 4

Figure 5:
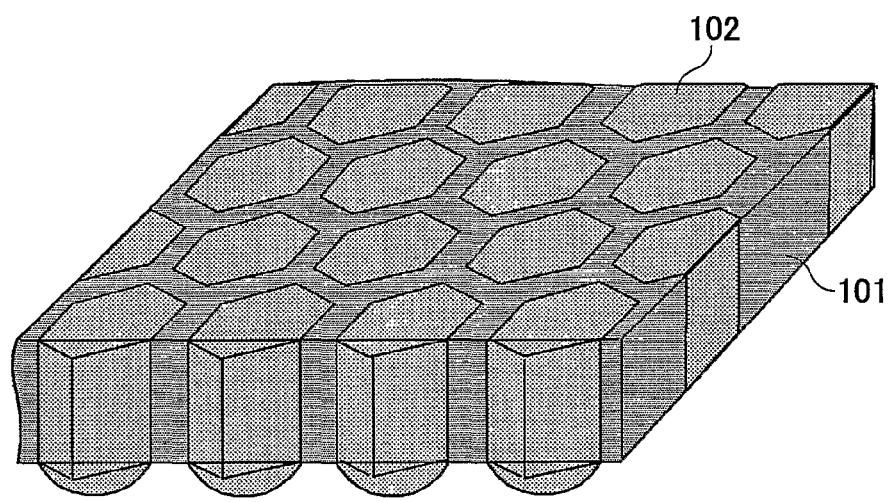
FIG. 5 is an oblique view diagram showing the lens array of the present invention.

In contrast to the microlens array of FIG. 1 in which the lens elements are arranged in the form of a lattice, Example 4 shown in FIG. 5 provides a lens array in which the lens elements are arranged in a staggered array.

Thus, it is possible with the present invention to manufacture a miniature lens array of staggered arrangement for the lens element shown in FIG. 5 while using a similar process explained heretofore. In this case, it should be noted that the opaque cell walls forming the cladding layer 101 form therein cells of hexagonal pillar shape as shown in FIG. 5, and the cores 102 filling the cells have the corresponding shape of hexagonal pillar.

Next, the eighth aspect of the present invention that uses the second substrate of hydrophobic nature will be explained with reference to FIG. 6.

(Case 1) Second Substrate is not Water-Repellent

Figure 6:
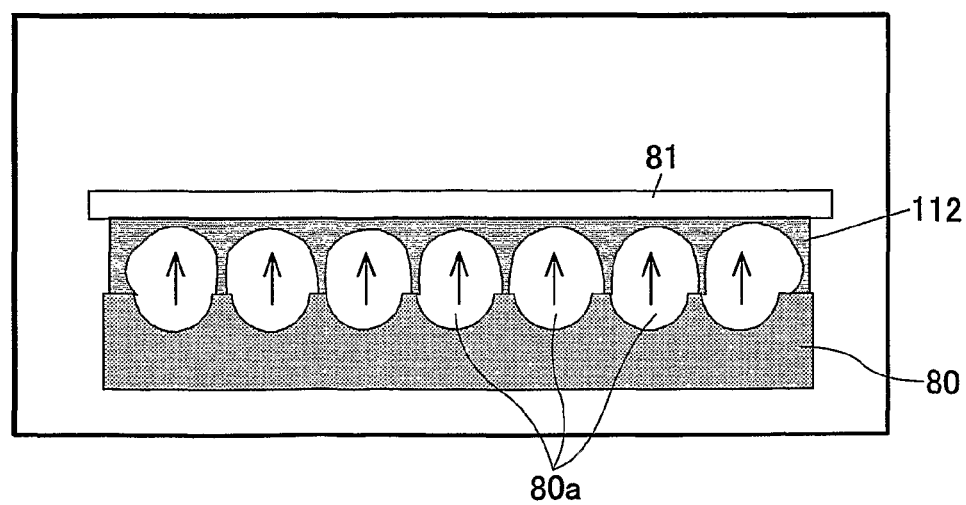
FIG. 6 is a diagram explaining the effect of the present invention.

In the case the second substrate 81 lacks water-repellency, the cells are formed in the cell array structure of a second material 112 corresponding to the deformable material 82 of FIGS. 2A-2F as shown in FIG. 6, wherein it will be noted that each cell has a closed end at the side facing the second substrate 81. This is because the film of the material 112 remained in contact with the second substrate 81 at the end part of the cells because of the high wetness between the second material 112 and the second substrate 81.

(Case 2) Second Substrate is Water-Repellent

In the case the second substrate 81 is repellent to water, there appears a cellular array structure similar to the case of Examples 1 and 2 shown in FIG. 2A-2F or 3A-3G in which each cell has opened ends. Such a structure is caused because the film of the second material 112 has moved elsewhere because of the poor wetting between the second material 112 and the second substrate 81.

From Cases 1 and 2 noted above, it will be understood that control of the cell array structure is possible by the water-repellent nature of the first substrate 80.

2. Examples of Manufacturing Optical Fiber Plate

Example 5

Method of Forming a Cell Array Structure of Columnar Elongated Cells

Figure 7:
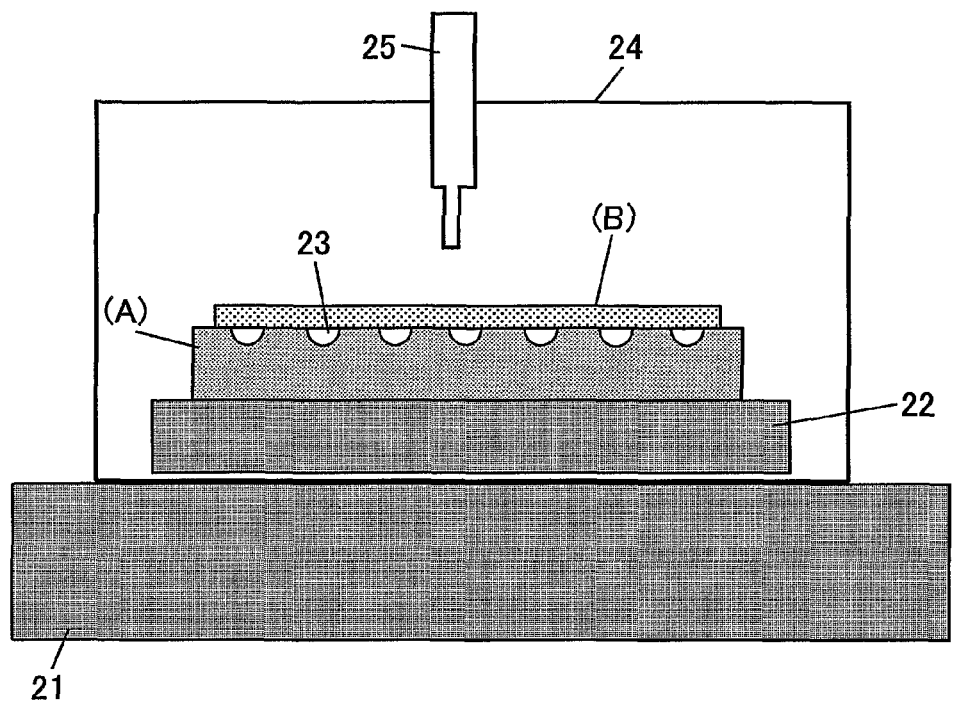
FIG. 7 is a side view diagram showing the manufacturing method of an optical fiber array according to Example 3 of the present invention.
Figure 8:
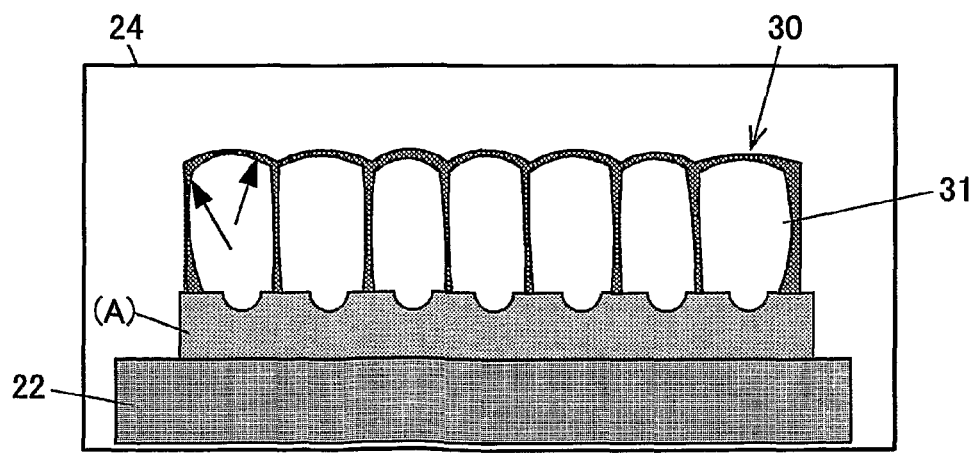
FIG. 8 is an enlarged side view diagram showing a process of forming a columnar cell array structure according to Example 3 of FIG. 7.
Figure 9:
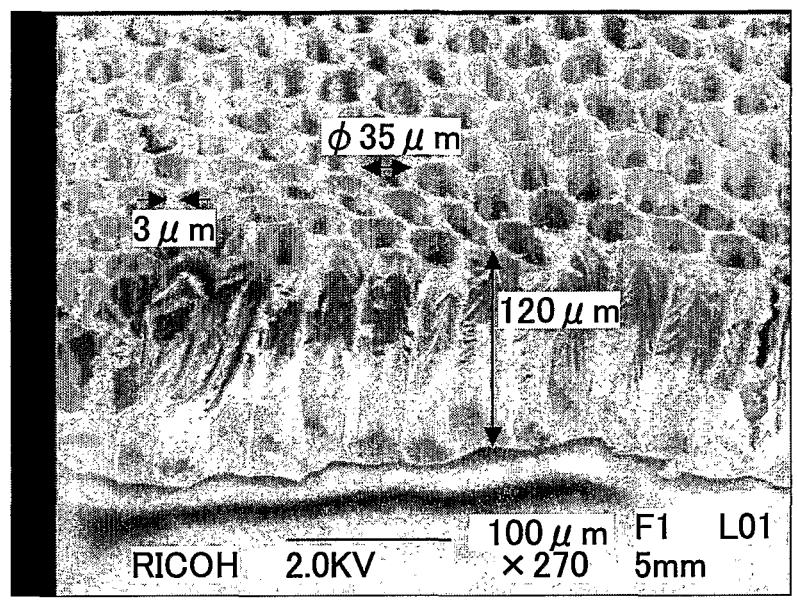
FIG. 9 is an oblique diagram showing the honeycomb structure formed according to Example 3 of FIG. 7 in an enlarged scale.

FIGS. 7-9 show the process of manufacturing an optical fiber plate (optical fiber array) according to Example 5.

Referring to the drawings, there is provided a temperature control apparatus 22 on a coater machine 21, and a substrate (A) carrying a large number of depressions on a top surface thereof with high density is mounted upon the temperature control apparatus 22.

With this embodiment, a cell array structure including therein fine columnar cells with high density is formed on such a substrate (A).

The construction and operation of Example 5 will be explained hereinafter.

1. Construction of Example 5

(1) Substrate (A)

The substrate (A) of FIG. 7 serves for the mold for growing a cell array structure thereon and determines the pitch of the cells in the cell array structure thus formed. More specifically, the substrate (A) is formed of a silicon rubber and is formed with depressions 23 having a semispherical shape of the diameter of 25 μm in a staggered pattern with a pitch of 38 μm.

(2) Cellular Structure Material (B)

The cell array structure material (B) of FIG. 7 forms the body of the cell array structure formed with a number of columnar, elongated cells. For the cell array structure material (B), it is possible to use an aqueous solution of commercially available gelatin (trade name Jellice) diluted by five times in purified water and added with a surfactant (dodecyl sodium sulfate) by 1 wt %. In this case, the sol-gel transition takes place for the material of the cell array structure at about 38° C.

(3) Temperature Control Apparatus

The temperature control apparatus 22 control the viscosity (sol-gel transition) by controlling the temperature of the cellular structural material (B).

(4) Pressure Control Apparatus

A pressure control apparatus 24 of FIG. 7 is an apparatus that compresses and evacuates gases and controls the dimension, particularly the height of the cell array structure. Further, the pressure control apparatus facilitates drying of the cellular structural material (B).

(5) Ejector

An ejector 25 of FIG. 7 is a device for ejecting the cellular structural material (B) on the substrate (A) with a predetermined amount.

(6) Coater Machine

The coater machine 21 of FIG. 7 is an apparatus that spreads the cellular structural material (B) ejected on the top surface of the substrate (A) from the ejector 25 to form a film of a predetermined thickness. In the illustrated example, the coater machine 21 is a spin-coater that utilizes a centrifugal force.

Operation of Example 1

(1) First, the ambient pressure of the coater machine 21 is controlled to a predetermined pressure such as 0.1 MPa by using the pressure control apparatus 24. This process is conducted for controlling the amount of gas dilation in the later process.

(2) The temperature of the substrate (A) is controlled by using the temperature control apparatus 22. Thereby, heating may be conducted by any of heater, infrared light, microwave, and the like. In the case of Example 1, an electric cartridge heater is used for the temperature control apparatus 22. The temperature may be set close to the sol-gel transition temperature such as 38° C. This temperature is chosen for controlling the viscosity, and hence sol-gel transition of the cellular structural material (B).

(B) Eject the cellular structural material (B) on the substrate (A) by using the ejector 25. Almost simultaneously, the cellular structural material (B) thus ejected is spread over the substrate (A) by squeezing or spin-coating, such that there are formed vacant spaces in the depressions 23. In this step of coating, the cellular structural material (B) may form a film having a film thickness of 1-100 µm. In the example of Embodiment 5, the cellular structural material (B) forms a film of the thickness of 10 µm. Ejection of the cellular structural material (B) from the ejector 25 is attained at the temperature of 45° C., and hence in the state of sol of low viscosity.

(4) Lower the ambient pressure of the coater machine 21, after lowering the temperature of the substrate (A) such that there is caused gel transition in the cellular structural material (B).

With Example 5, the control temperature of the temperature control apparatus 22 is reduced to 20° C. and the ambient pressure is lowered thereafter to 0.03 MPa by using the pressure control apparatus 24. With this, the gas in the spaces of the depressions starts dilatation and the spaces cause extension as represented in FIG. 8.

Thereby, because of the simultaneous dilatations in the adjacent depressions 23, lateral expansion of the spaces is restricted and the dilatation of the spaces takes place only in the direction upward from the substrate (A). Thus, there are formed a number of cells 31 simultaneously in the cellular structural material (B) in the form of mutually independent elongated bubbles, while the bubbles or cells 31 thus formed form a columnar cell array structure 30.

Thereafter, the temperature of the substrate (A) is lowered by the temperature control apparatus 22, and the cellular structural material (B) thus formed with a cell array structure is solidified and dried while maintaining the shape thereof. Thereby, the time for the solidification is reduced greatly by evacuating the ambient by using the pressure control apparatus 24.

(5) Next, the processing chamber of the pressure control apparatus 24 is opened and the work corresponding to the cell array structure thus formed is taken out to the outside.

FIG. 8 shows the cell array structure thus formed in an enlarged scale in the state that the cell array structure is taken out from the pressure control apparatus 24 after 10 minutes elapsed from the dilatation process and in the state that the substrate (A) is removed.

It was confirmed that the cell array structure thus obtained is sufficiently dried and has a mechanical strength maintaining its shape. In the illustrated example, each cell 31 in the cell array structure 30 has a diameter of 35 µm and a length of 120 µm, with the wall thickness of 3 µm.

Example 6

Embodiment Corresponding to Eighteen Aspect of the Invention

Next, the embodiment corresponding to the eighteenth aspect of the invention will be explained.

Figure 10:
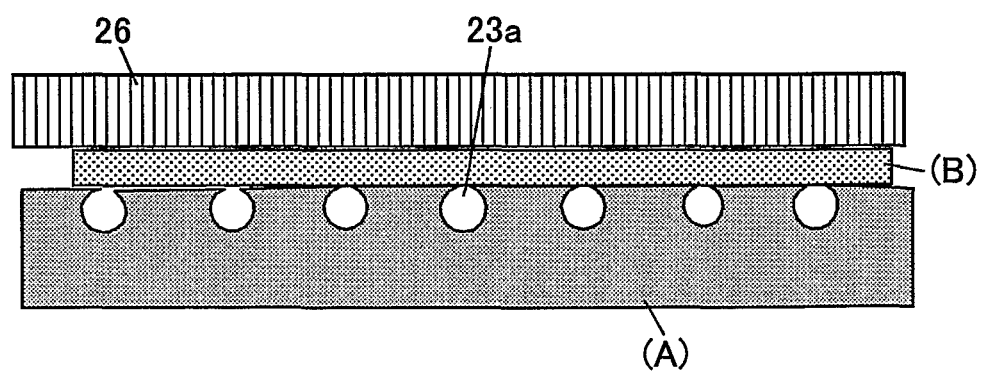
FIG. 10 is a side view diagram showing the manufacturing process of an optical fiber array according to Embodiment 4 of the present invention.

The eighteen aspect of the invention corresponds to the construction shown in FIG. 10 in which a flat slab structure 26 formed with a number of penetrating holes is contacted to the deformable material (B) on the substrate (A). Thereby, the penetrating holes are formed with a pitch smaller than the pitch of the cells in the cell array structure.

It should be noted that such minute penetrating holes can be formed easily with a diameter of 0.1 µm or less by causing anode oxidation in an aluminum plate of the thickness of 200 µm. Because the penetrating holes are formed with a pitch smaller than the pitch of the cells in the cell array structure, it becomes possible to cause dilatation in the deformable material (B) without damaging the shape of the individual cells 31 by contacting the slab structure 26 to the backside of the deformable material (B).

Example 7

Embodiment Corresponding to Twentieth Aspect of the Invention

Figure 11A:
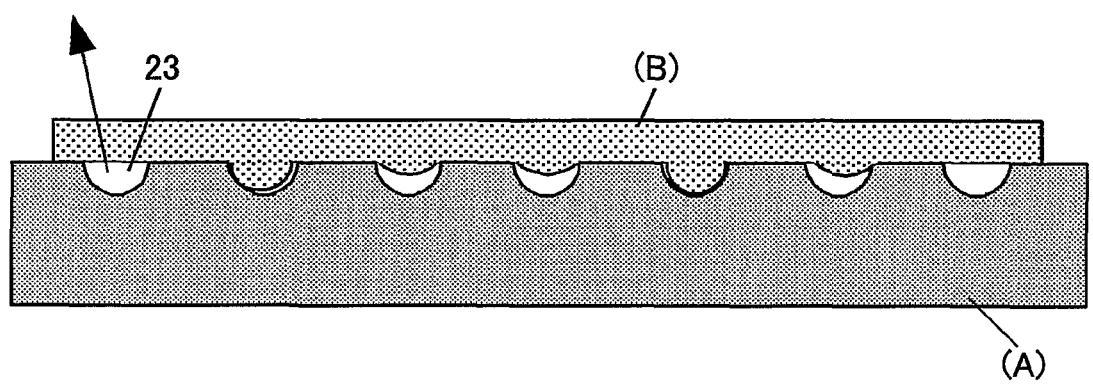
FIGS. 11A and 11B are diagrams explaining the problem that arises when a material of the deformable layer is applied to the substrate formed with semi-spherical depressions.

FIG. 11A schematically shows the problem that may arise when a deformable material (B) is applied to a surface of the substrate (A) formed with semispherical depressions 23.

More specifically, FIG. 11A shows the situation in which the gas in the depression 23 is dissolved into the deformable material (B) or escapes to the outside by passing through the deformable member (B) as shown at the left part of the drawing. Associated with such degassing, it can be seen in FIG. 11A that the deformable material (B) invades into the depressions in some of the depressions 23.

Figure 11B:
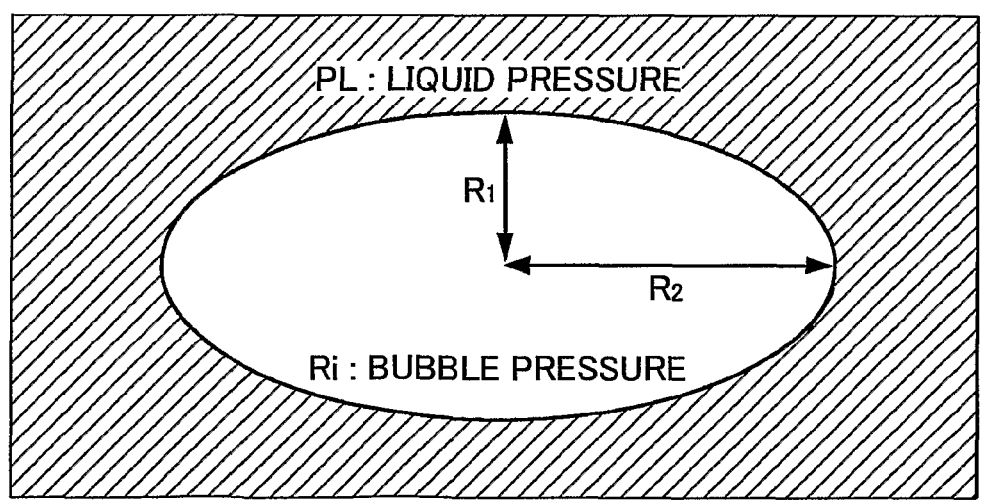

FIG. 11B illustrates the Young-Laplace equation.

According to the Young-Laplace equation, a pressure difference ΔP between a gas pressure Pi and a liquid pressure $P_L$ is represented for a bubble of elliptical shape formed in a liquid as $$\Delta P = Pi - P_L = \sigma(1/R_1 + 1/R_2),$$

wherein R1 and R2 respectively represent the radius of the bubble measured along a minor axis thereof and the radius of the bubble measured along a major axis thereof.

Thus, the foregoing equation represents that the pressure difference ΔP is increased when the radius $R_1$ and the radius $R_2$ are decreased. Here, σ represents the surface tension of the liquid.

Thus, when the diameter of the depression 23 has become 30 µm or less, the pressure of the bubble is increased according to the Young-Laplace equation, resulting in absorption of the gas by the liquid. Alternatively, the gas escapes from the depression 23 to the outside by passing through the deformable material (B). In any of these cases, there arises the problem that the deformable material invades into the depression 23 as shown in FIG. 11A.

Figure 12A:
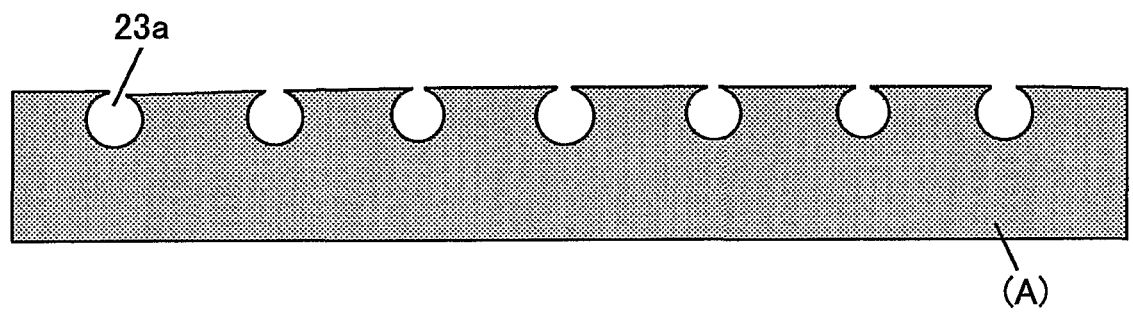
FIG. 12A is another side view diagram showing a substrate formed with spherical depressions.

Thus, Example 7 reduces this problem by decreasing the area of the depression 23 opened at the surface of the substrate (A) as represented in FIG. 12A, in which it will be noted that there are formed a number of spherical voids in the substrate (A) such that each spherical void is exposed at the surface of the substrate (A) at an opening having a diameter much smaller than the diameter of the void itself.

It should be noted that the structure of FIG. 12A is obtained easily by the steps of: arraying polystyrene microspheres on the surface of the substrate (A); covering the microspheres by an UV-cure resin layer; and removing the polystyrene microspheres by an organic solvent such as acetone.

Figure 12B:
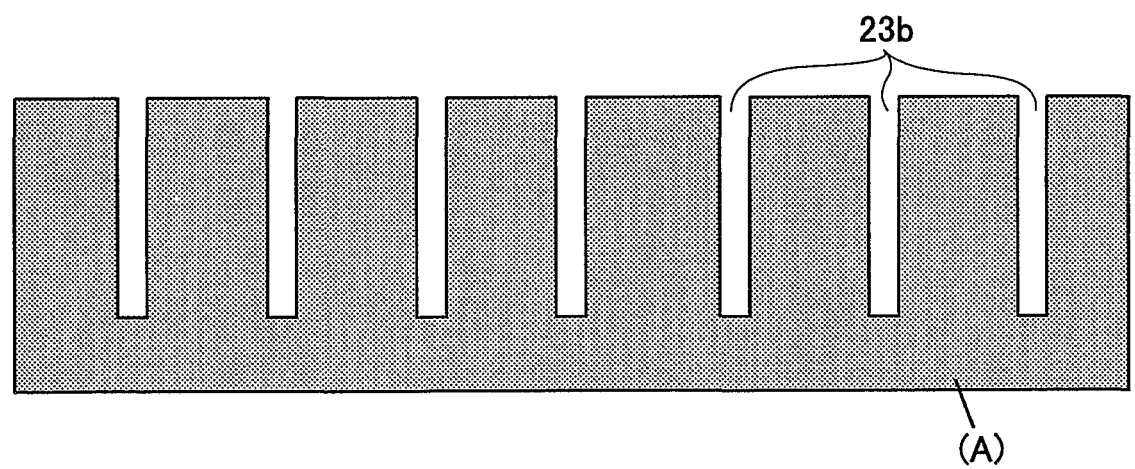
FIG. 12B is another side view diagram showing a substrate formed with depressions of comb-tooth shape formed by photolithography.

FIG. 12B shows another example of the substrate (A) in which there are formed a number of deep depressions 23b in the substrate (A). The structure of FIG. 12B can be formed by photolithography.

Example 8

Embodiment Corresponding to Twentieth Aspect

FIGS. 13A-13D, 14A and 14B show the process of manufacturing an optical fiber array according to the twentieth aspect of the invention.

With the twentieth aspect, there is formed a cell array structure 30 in which the cells have a closed end at the side of the substrate (A) while the other, opposite end is opened.

Figure 13A:
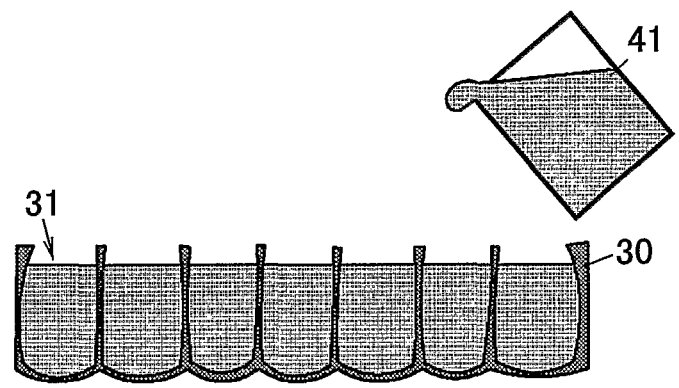
FIGS. 13A-13D are diagrams showing the manufacturing process of optical fiber array according to a molding process.

(1) The cell array structure 30 obtained with the process of Example 5 is turned over upside down as shown in FIG. 13A, and a transparent core material 41 is injected to the cells therein in this state. In the illustrated example, an uncured UV-cure resin is used for the core material 41. More specifically, the illustrated example uses an acrylic UV-cure resin of the refractive index of 1.56 for the core material 41.

Figure 14A:
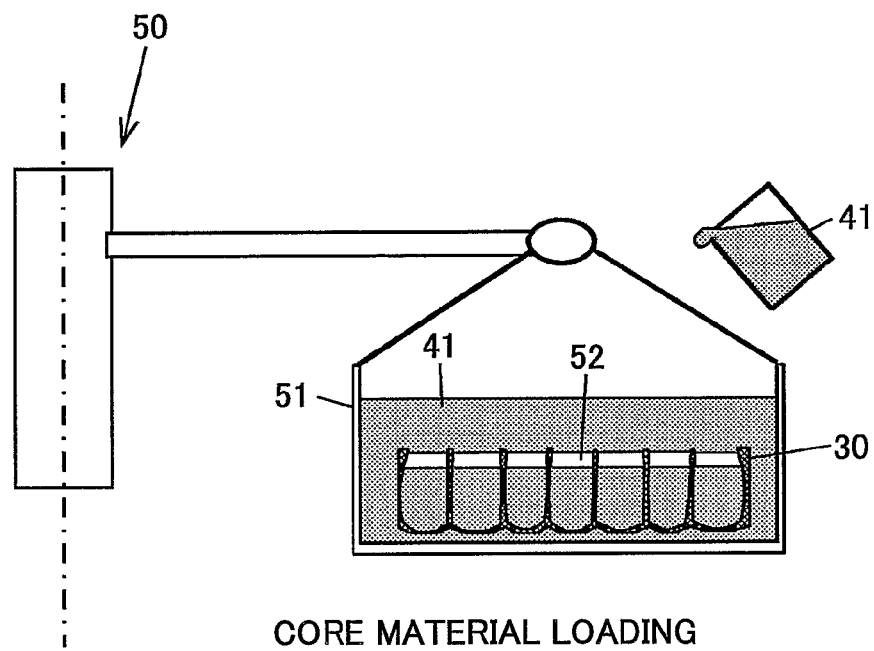
FIGS. 14A and 14B are diagrams explaining the process of filling a core material in a cell array structure by using a centrifugal separator in the embodiment of manufacturing an optical fiber array.
Figure 14B:
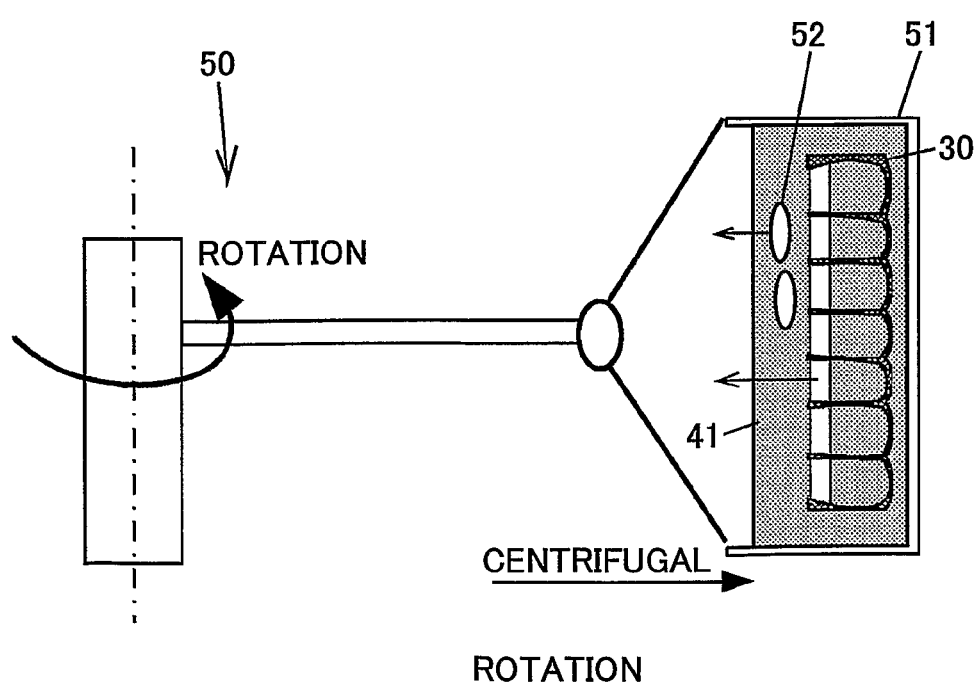

In order to ensure positive injection of the more material 41 into the miniature cells 31 without voids, the present embodiment uses a centrifugal separator 50 shown in FIG. 14A, and the core material 41 is injected in the step of FIG. 14B with a pressure of 3000G for the duration of 30 seconds by operating the centrifugal separator 50.

Thus, in the step of FIG. 14A, the cell array structure 30 is mounted upon a rotary drum 51 of the centrifugal separator 50 and the core material 41 is poured upon the cell array structure 30.

Next, in the step of FIG. 14B, the drum 51 is rotated at high speed and the core material 41 is pressed into the cells 3 by the centrifugal force acting upon the core material 41. Thereby, any air bubble 52 in the cell 41 is separated and the cells 31 are fully loaded with the core material 41.

Figure 13B:
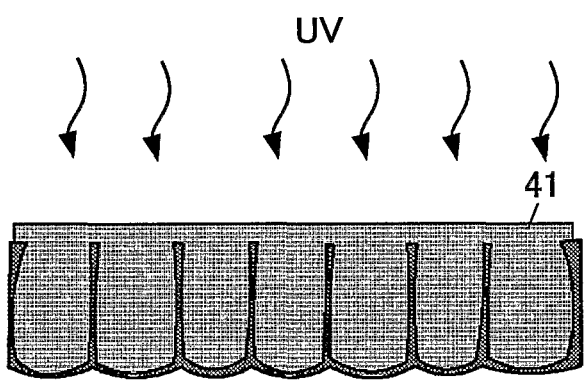

(2) Next, in the step of FIG. 13B, the UV-cure resin forming the core material 41 is cured by irradiating UV light.

(3) Next, the cell array 30 of gelatin is replaced with other, preferably opaque material capable of performing optical shielding function, in view of the fact that gelatin forming the cell array 30 has poor resistance to water and relatively high refractive index.

Figure 13C:
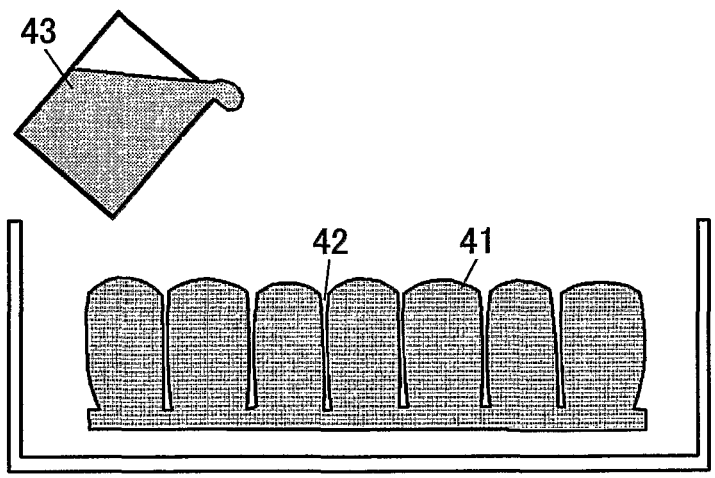

Thus, the optical fiber array of FIG. 13B is dipped into water for removal of the cell walls formed of gelatin in the step of FIG. 13C, and with this, there are formed gaps 42 between the cores 41 in correspondence to the gelatin cell walls.

(4) Further, in the step of FIG. 13C, a cladding material 43 is injected into the gaps 42 thus formed by using the centrifugal separator 50 of FIGS. 14A and 14B similarly to the case of the cores 41. In the illustrated example, a PMMA solution in which polymethacrylate (PMMA) having a refractive index of 1.49 dissolved into a volatile solvent and added with carbon black with the amount of 0.5 wt % is used.

Figure 13D:
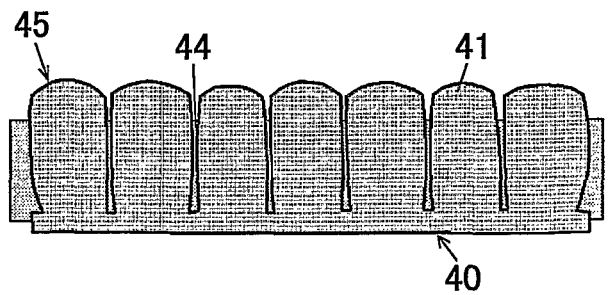

After the injection of the cladding material 43, the cladding structure 44 is formed after drying as shown in FIG. 13D.

Figure 15:
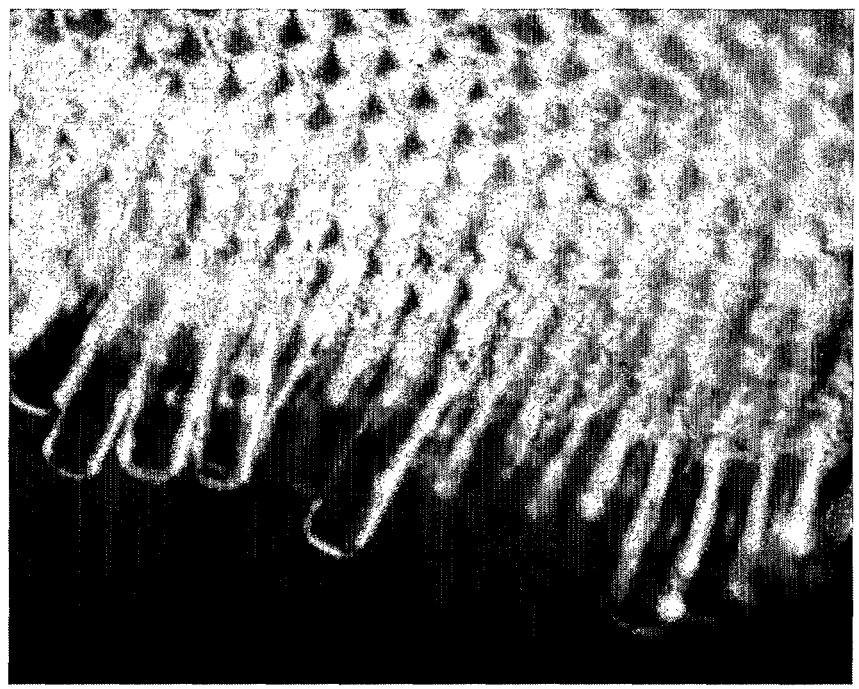
FIG. 15 is a diagram showing an optical fiber array manufactured according to the molding process of the present invention.

(5) With the foregoing process, it is possible to manufacture a miniature optical fiber plate or optical fiber array 40 shown in FIG. 13D or 15 with simple process and short time period, such that optical fibers 45 having a diameter of 35 µm and carrying a cladding layer of 3 µm thickness are arranged in the form of array of the height of 120 µm.

It should be noted that the efficiency of utilization of light of such an optical fiber plate 40 reaches as large as 22% in the case the distance to the optical source is set to 15 µm or less.

Example 9

Figure 16A:
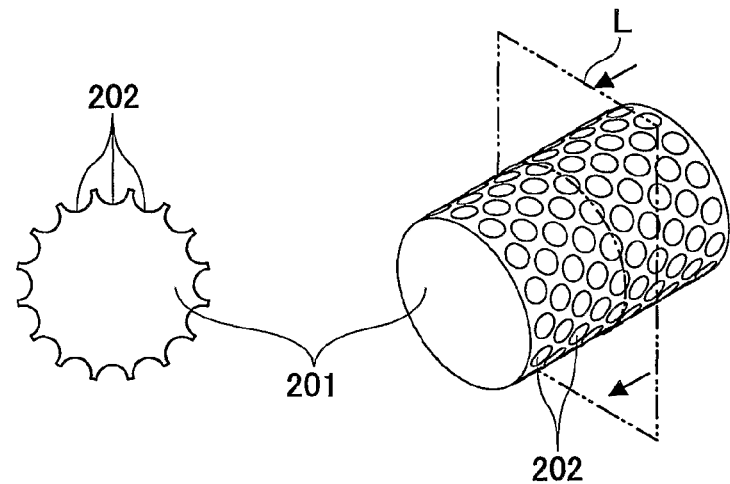
FIGS. 16A-16C are diagrams showing further modifications of the present invention.
Figure 16B:
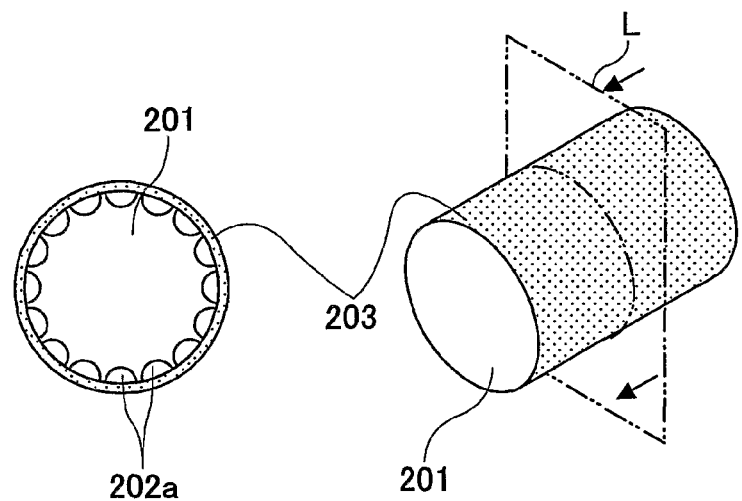

While the substrate or "mold" used in the preceding embodiments have a flat top surface formed with the depressions, the present invention is not limited to such a flat substrate and it is also possible to use a cylindrical substrate 201 as shown in FIG. 16A. In each of FIGS. 16A-16C, it should be noted that the right drawing shows the cylindrical substrate 201 and the components formed thereon in an oblique view while the left drawing shows the cross-section taken along a plane L.

As represented in FIG. 16A, the cylindrical substrate 201 is formed with a number of depressions 202 corresponding to the depressions 80a of FIG. 2A, and a deformable material 203 is coated upon the cylindrical surface of the substrate 202 in correspondence to the deformable material 82 of FIG. 2B. Thereby, there are formed isolated spaces on the surface of the cylindrical substrate 201 in correspondence to the depressions 202.

Figure 16C:
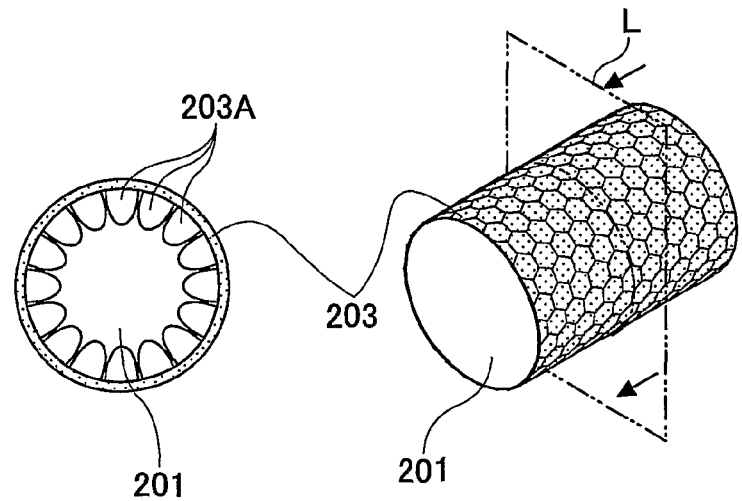

Further, in the step of FIG. 16C, the ambient pressure is decreased and there is caused dilatation in the gas filling the depressions 202, and there are formed elongated cells 203A in the deformable material 203 now forming a cell array structure, such that the cells 203A are aligned in the direction perpendicular to the cylindrical surface of the substrate.

Example 10

Figure 17:
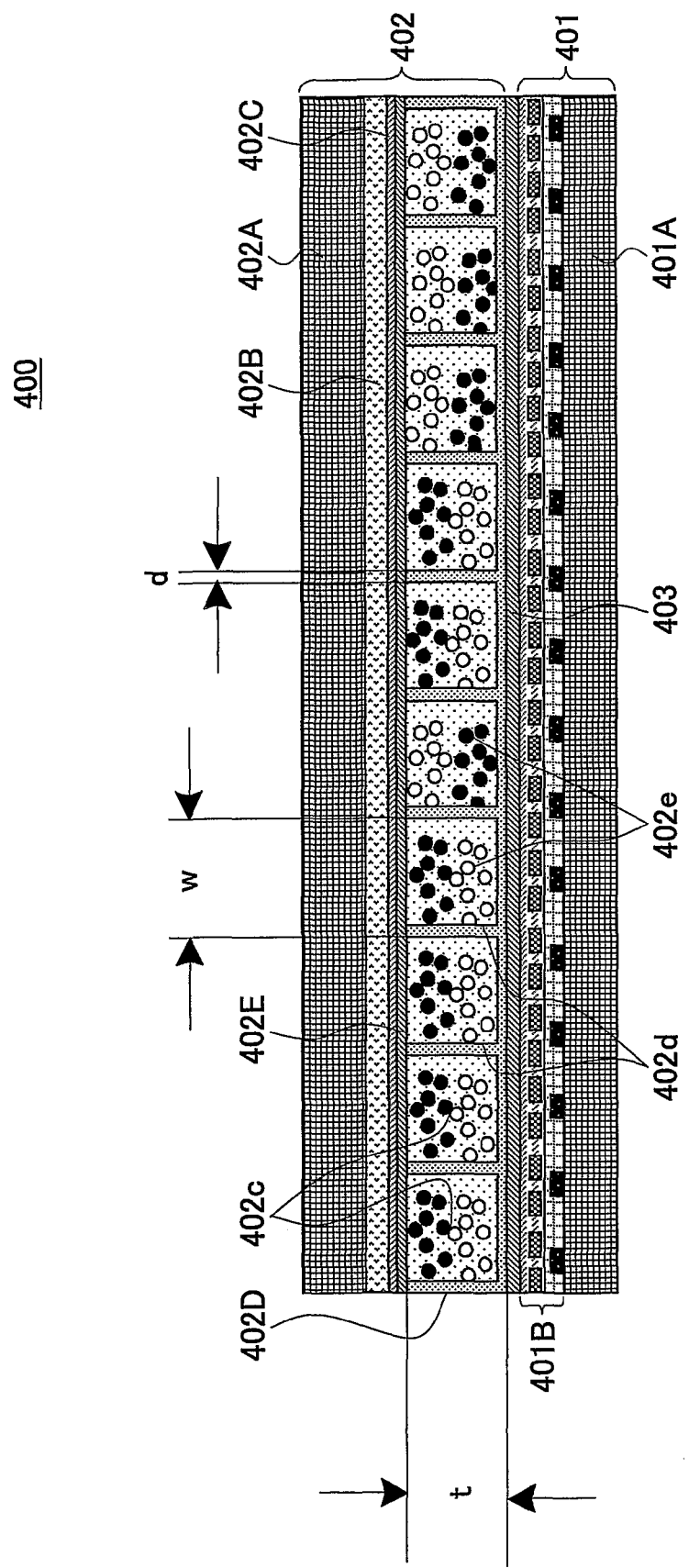
FIG. 17 is a diagram showing the construction of an electronic reusable paper according to an embodiment of the present invention.

FIG. 17 shows an electronic reusable paper 400 according to Example 10 of the present invention.

Referring to FIG. 17, the electronic reusable paper 400 is includes a back plane 401 formed of a substrate 401A carrying thereon an electrode layer 401B including various electrodes and active elements, and a front plane 402 is adhered upon the back plane 401 by an adhesive layer 403.

The front plane 401 includes a transparent substrate 402A and a transparent electrode layer 402B formed thereon, wherein the transparent electrode layer 402B is adhered to a cell structure 402D including therein mutually isolated cells 402c in such a manner that the cells 402c are separated by cell walls 402d. The cells 402c are filled with an electrophoretic substance 402e and covered with a sealing layer 402E, wherein the transparent electrode layer 402B is adhered to a sealing layer 402E by way of an adhesive layer 402C.

Thus, by applying a voltage across the electrode pattern in the electrode layer 401B of the backplane 401 and the transparent electrode layer 402B of the front plane 402, there is caused electrophoretic migration in the electrophoretic substance 402c filling the cells 402c, and images are displayed by the electrophoretic migration thus inducted.

In an example, the cell structure 402D has a thickness t of 50 µm, and each cell 402c may have a width W of 150 µm. Further, the cell wall 402d may have a thickness of 8 µm or less.

FIGS. 18A-18G show the fabrication process of the electronic reusable paper 400 of FIG. 18.

Referring to FIG. 18A, a mold 501 of a silicone rubber is provided such that the mold 501 is formed with depressions 501A in a staggered pattern, similarly to the step of FIG. 2A, except that the depressions 501A are formed in a cylindrical pit having a diameter of 100 µm and with a pitch of 150 µm.

Further, a UV-cure acrylic resin admixed with carbon black particles with a concentration of 0.5 wt % is applied to the substrate 501 by a coating process to form a deformable layer 502 in the step of FIG. 18A, and in the step of FIG. 18B, the ambient behind the deformable layer 502 is evacuated to the pressure of 0.03 MPa to cause expansion of the gas filling the spaces 501A.

After curing the deformable material 502 by UV irradiation, the substrate 501 is removed, and the cell structure 402D of the structure of FIG. 17 is obtained by the cured material 502 such that the cells 402c are formed in the cell structure 402D in the form isolated with each other by the cell walls 402d. The cell structure thus formed has an A5 size (148 mm×210 mm), with the thickness t of 50-70 µm, the cell pitch Λ of 150 µm, and the cell wall thickness d of 8 µm.

Figure 18D:
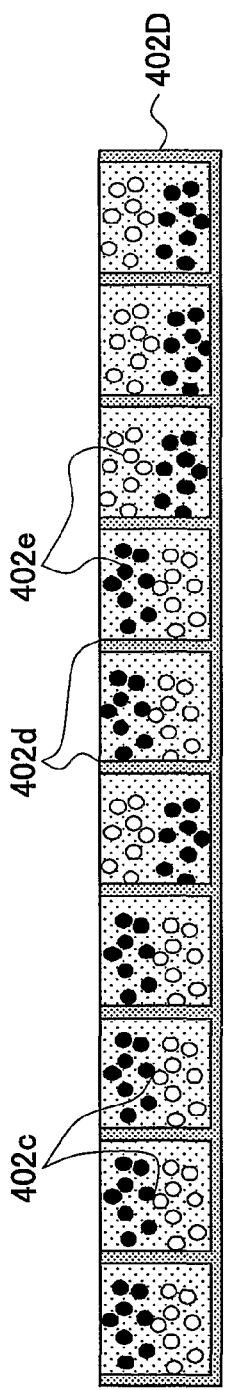
Figure 18E:
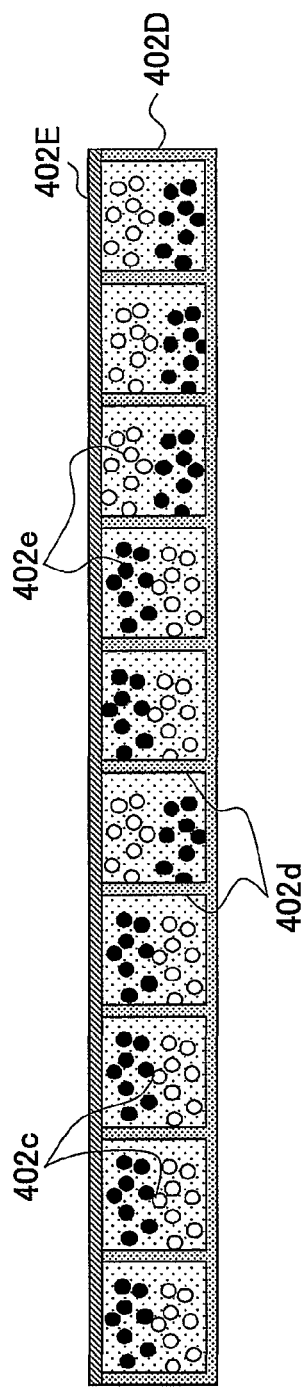

Next, in the step of FIG. 18D, the cells 402c are filled with an electrophoretic substance, typically formed of titanium oxide particles, carbon black particles and isoparaffin, and in the step of FIG. 18E, the seal layer 402E of a urethane resin is provided so as to cover the opened cells 402c such that there remains no air bubbles.

Figure 18F:
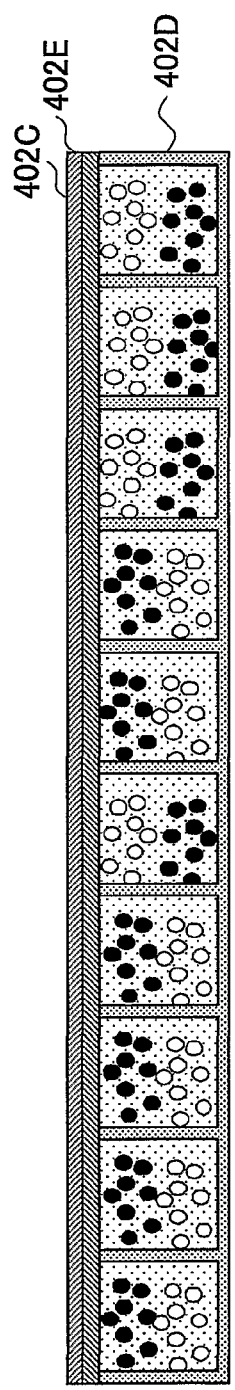

Next, in the step of FIG. 18F, the adhesive layer 402 is applied to the seal layer 402E, and in the step of FIG. 18E, the transparent substrate 402A carrying thereon the transparent electrode 402B of ITO, or the like, is adhered to the adhesive layer 402C in the upside down state.

Figure 18G:
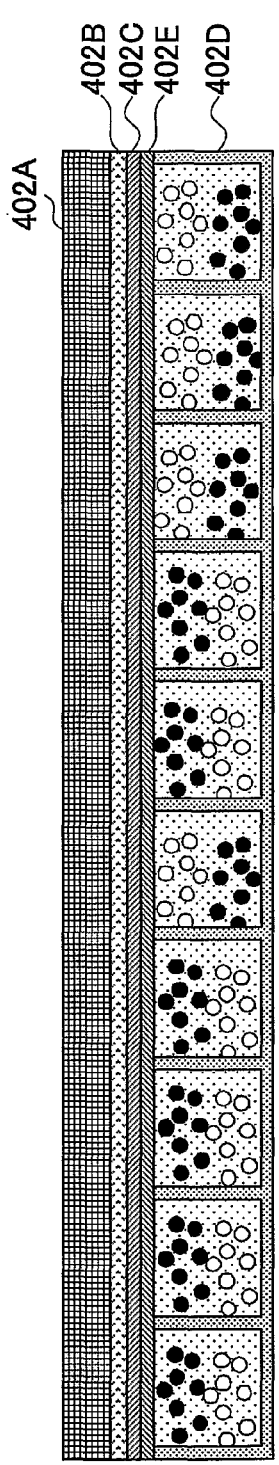
Figure 18H:
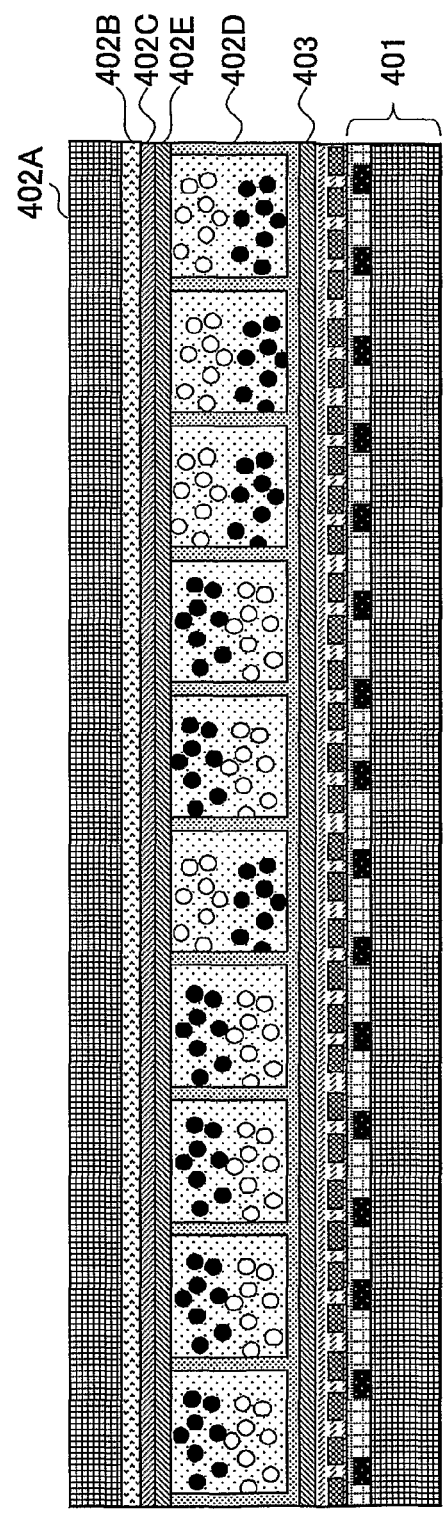
Figure 19A:
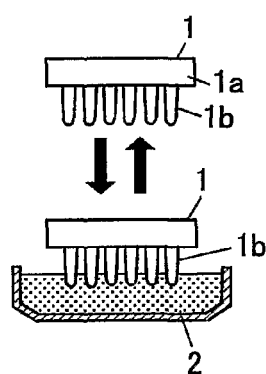
FIGS. 19A-19F are diagrams explaining the manufacturing method of an optical fiber array according to a related art.
Figure 19B:
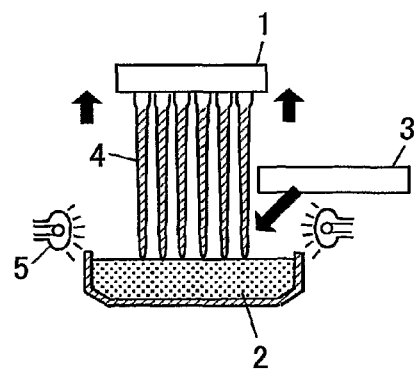
Figure 19C:
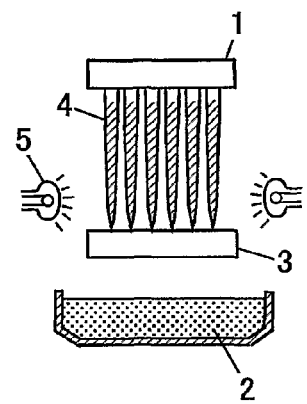
Figure 19D:
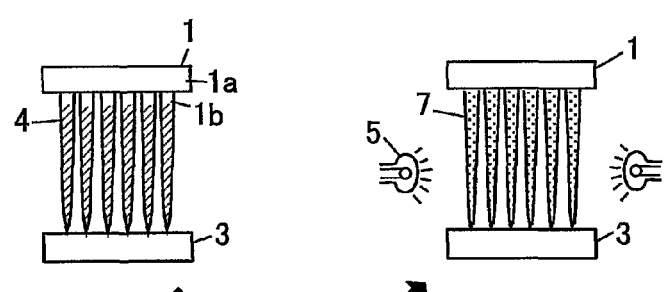
Figure 19E:
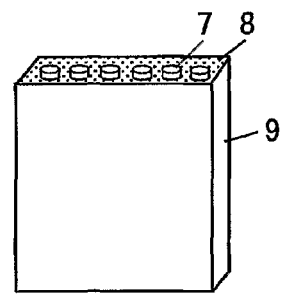
Figure 19F:
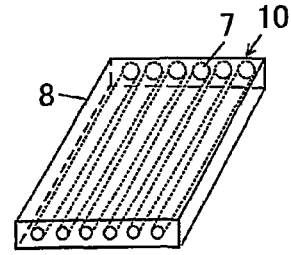

Further, in the step of FIG. 18G, the structure of FIG. 18E is adhered to the backplane 401 via the adhesive layer 403, and the electronic reusable paper 400 of FIG. 17 is obtained.

Further, the present invention is by no means limited to the embodiments described heretofore, but various variations and modifications may be made without departing from the scope of the invention.

The present invention is based on Japanese priority applications No 2005-262202 and 2005-322493 respectively filed on Sep. 9, 2005 and Nov. 7, 2005, which are incorporated herein as reference.

The invention claimed is:

1. A method of manufacturing a cell array structure, comprising:
    a first step of laminating a deformable layer capable of causing plastic deformation over a top surface of a substrate, said substrate being formed with a plurality of mutually separated depressions on said top surface, such that said deformable layer forms a mutually isolated space in each of said plural depressions; and
    a second step of extending said space for said plurality of depressions simultaneously in an upward direction of said substrate by causing plastic deformation in said deformable layer, such that a thickness of said deformable layer is increased in a state after said second step as compared with a state before said second step and such that there are formed a plurality of columnar cells respectively in correspondence to said plurality of depressions, said step of extending said space being conducted while restricting lateral expansion of said space in each of said plurality of columnar cells as a result of interference of adjacent spaces,
    wherein said second step includes a step of lowering a pressure of a space outside said deformable layer laminated on said substrate, said plastic deformation of said deformable layer being induced by a gas pressure in said plurality of depressions.

2. The method as claimed in claim 1, wherein said second step is conducted such that an entire length of side surfaces of said plurality of cells extend in a direction perpendicular to said top surface of said substrate.

3. The method as claimed in claim 1, further comprising controlling a viscosity of a material of said deformable layer by controlling a temperature of the material with a temperature control device.

4. The method as claimed in claim 1, wherein said deformable layer contains a surfactant.

5. The method as claimed in claim 4, wherein said deformable layer includes an aqueous solution of gelatin added with a surfactant.

6. The method as claimed in claim 4, wherein said deformable layer includes a material of which sol-gel transition is controlled by temperature.

\* \* \* \* \*